(12) United States Patent
Kapur et al.

(10) Patent No.: US 6,912,612 B2
(45) Date of Patent: Jun. 28, 2005

(54) SHARED BYPASS BUS STRUCTURE

(75) Inventors: Suvansh K. Kapur, Portland, OR (US);
Kai Cheng, Portland, OR (US); Robert J. Hoogland, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 10/358,568

(22) Filed: Feb. 5, 2003

(65) Prior Publication Data

US 2003/0163649 A1 Aug. 28, 2003

Related U.S. Application Data

(60) Provisional application No. 60/359,316, filed on Feb. 25, 2002.

(51) Int. Cl.[7] .......................... G06F 13/36; G06F 12/00; G01R 31/08
(52) U.S. Cl. ...................... 710/309; 710/317; 370/225; 370/447; 711/138; 711/141
(58) Field of Search ................................ 710/316–317; 370/225, 447; 711/138, 141

(56) References Cited

U.S. PATENT DOCUMENTS

| | | | | | |
|---|---|---|---|---|---|
| 5,559,970 A | * | 9/1996 | Sharma | ...................... | 710/317 |
| 5,859,975 A | * | 1/1999 | Brewer et al. | ............... | 709/213 |
| 5,896,516 A | * | 4/1999 | Powell et al. | ................ | 710/317 |
| 6,125,429 A | * | 9/2000 | Goodwin et al. | ........... | 711/143 |
| 6,757,777 B1 | * | 6/2004 | Griessbach et al. | ......... | 710/316 |
| 6,789,173 B1 | * | 9/2004 | Tanaka et al. | ............... | 711/147 |
| 6,807,172 B1 | * | 10/2004 | Levenson et al. | ........... | 370/389 |
| 6,839,794 B1 | * | 1/2005 | Schober | ...................... | 710/316 |

OTHER PUBLICATIONS

High Bandwidth, Low Latency Interconnection Network for Information Transfer, IBM Techinical Disclosure Bullentin, Jan. 1996.*

* cited by examiner

Primary Examiner—Tim Vo
(74) Attorney, Agent, or Firm—Blakely, Sokoloff, Taylor & Zafman LLP

(57) ABSTRACT

A shared bypass bus structure for low-latency coherency controller access in a coherent scalable switch. In a coherent scalable switch with multiple coherent interconnect ports, distributed coherency control structures, and a crossbar interface between them, a shared bypass bus permits data transfer between the coherent interconnect ports and the coherency control structures while bypassing the crossbar interface. Some embodiments may comprise scalable switches to support one or more sets of processors with substantially independent snoop or cache coherency paths or arrangements.

5 Claims, 20 Drawing Sheets

SPS HIGH-LEVEL MICROARCHITECTURE

SYSTEM CONFIGURATION WITH 4 PROCESSORS

SYSTEM CONFIGURATION WITH 16 PROCESSORS

SPS HIGH-LEVEL MICROARCHITECTURE

| USAGE | FEATURE | PRINCIPLE BENIFIT |
|---|---|---|
| IN-SYSTEM CLUSTERING | STATIC PARTITIONING | SMALL FOOTPRINT CLUSTERING |
| ENVIRONMENT SEGREGATION | STATIC/DYNAMIC PARTITIONING | SERVER CONSOLIDATION |
| ROLLING UPGRADES | STATIC/DYNAMIC PARTITIONING | ENHANCED RAS (REDUCES DOWNTIME) |
| HARDWARE REPAIR | NODE HOT PLUG | ENHANCED RAS (REDUCES DOWNTIME AND MEAN-TIME-TO-REPAIR) |
| IN-SYSTEM CAPACITY SCALING | NODE HOT PLUG | ENHANCED RAS AND PERFORMANCE |

FIG. 8

Prefetch Profile Selection

| Prefetch Profile | Condition | Indicated By | Comments | Max_lines_in_fit |
|---|---|---|---|---|
| Aggressive | Any active stream is for a PCI-X or VXB agent | Prefetch horizon field | Non zero value | 8 |
|  | More than one PCI segment active | At least two PCI streams (prefetch horizon = 0 for initial request) are active where HubID = 0 for one and HubID = 1 for another. |  |  |
| Conservative | Any condition other than those listed above. | N/A |  |  |

FIG. 11A

Dynamic Look-up Table

| Number of Active Streams | Number of Speculative Prefetch Lines Ahead of Real Request | |
|---|---|---|
|  | Aggressive | Conservative |
| 1 | 8 | 4 |
| 2 | 4 | 2 |
| 3 | 2 | 2 |
| 4, 5, 6, 7, 8 | 2 | 1 |

FIG. 11B

UNIFIED READ CACHE/BUFFER WITH ADAPTIVE PRE-FETCH SCHEDULING - SPACE USAGE EXAMPLE.

Inactivity Timer Programming Recommendations

| Configuration | PCI Subsystem | Timer Value |
|---|---|---|
| Single-Node | 66 Mhz, 64-bit | 2.56 us |
| Multi-Node | 66 Mhz, 64-bit | 1.28 us |
| N/A | 33 Mhz, 32-bit<br>33 Mhz, 64-bit | 5.12 us |

FIG. 13

SCALABLE COHERENT CROSSBAR SWITCH WITH SHARED
BYPASS BUS STRUCTURE

SHARED CROSSBAR BYPASS BUS STRUCTURE CONNECTIVITY
FOR REGION A'S SCALABILITY PORTS

SHARED CROSSBAR BYPASS BUS STRUCTURE CONNECTIVITY
FOR REGION B'S SCALABILITY PORTS

SHARED BYPASS BUS STRUCTURE

CROSS REFERENCE TO RELATED APPLICATIONS

This application claims priority of the filing date of co-pending U.S. provisional application 60/359,316, filed Feb. 25, 2002.

BACKGROUND

1. Technical Field

An embodiment of the invention pertains generally to processor systems, and in particular pertains to scalable processor systems.

2. Description of the Related Art

With the rapid evolution of the Internet requirements for enterprise server systems have become increasingly diverse. Front-end and departmental servers are very cost and power sensitive while back-end servers that traditionally run database type applications require the highest level of performance along with multi-dimensional scalability and 24×7 availability. This segmentation of the server platforms has led to the development of a multitude of chipsets. A chipset encompasses the major system components that move data between the main memory, the processor(s) and the I/O devices. System vendors have designed separate chipsets with different system architectures to address the needs of different server segments or use industry standard components to address the needs for low-end systems and design proprietary components for mid-range and high-end systems.

Current systems have memory connected to a processor to store data such as data that is accessed with streams. A stream is a contiguous sequence of requests from an agent typically connected to the processor and memory system via a chipset or the like. The memory may include dynamic random access memory and the requests are processed in the same order as they are received. Processing the requests in the same order that they are received reduces memory bandwidth when, for example, a page replace conflict or DIMM turn around conflict forces a transaction to wait for a prior transaction to finish. Further, current systems provide a single path for cache coherency operations and data transfer, causing cache coherency transactions to wait for data transfers, increasing snoop latency.

Coherent transactions limit the bandwidth for transactions from a peripheral input-output (I/O) bus in processor-based systems such as desktop computers, laptop computers and servers. Processor-based systems typically have a host bus that couples a processor and main memory to ports for I/O devices. The I/O devices, such as Ethernet cards, couple to the host bus through an I/O controller or bridge via a bus such as a peripheral component interconnect (PCI) bus. The I/O bus has ordering rules that govern the order of handling of transactions so an I/O device may count on the ordering when issuing transactions. When the I/O devices may count on the ordering of transactions, I/O devices may issue transactions that would otherwise cause unpredictable results. For example, after an I/O device issues a read transaction for a memory line and subsequently issues a write transaction for the memory line, the I/O device expects the read completion to return the data prior to the new data being written. However, the host bus may be an unordered domain that does not guaranty that transactions are carried out in the order received from the PCI bus. In these situations, the I/O controller governs the order of transactions.

The I/O controller places the transactions in an ordering queue in the order received to govern the order of inbound transactions (transactions toward main memory and/or processors) from an I/O bus, and waits to transmit the inbound transaction across the unordered interface until the ordering rules corresponding to each transaction are satisfied. However, issuing transactions one at a time as the transaction satisfies ordering rules may limit the latency of a transaction to a nominal latency equal to the nominal snoop latency for the system. In addition, when multiple I/O devices transmit coherent transactions to the I/O controller, transactions unnecessarily wait in the ordering queue for coherent transactions with unrelated ordering requirements. For example, in conventional systems, a read transaction received subsequent to a write transaction for the same address will wait for the write transaction to issue even though the read transaction may have issued from a different I/O device, subjecting the read transaction to ordering rules independent from the ordering rules of the write transaction. As a result, the latency of the snoop request, or ownership request, for the write transaction adds to the latency of the read transaction and when a conflict exists with the issuance of the ownership request for the write transaction, the latency of the write transaction, as well as the read transaction, will be longer than the nominal snoop latency for the system.

I/O devices continue to demand increasing bandwidth, increasing the amount of time transactions remain in an ordering queue. For example, in conventional products, the number of delays resulting from a foreseeable read transaction that waits to access a memory line across the unordered interface and a read transaction that waits for a write transaction to satisfy ordering requirements when the write transaction will write to a different memory line, can escalate in proportion with bandwidth.

BRIEF DESCRIPTION OF THE DRAWINGS

The invention may be understood by referring to the following description and accompanying drawings that are used to illustrate embodiments of the invention. In the drawings:

FIG. 8 depicts a table to compare embodiments comprising partitioning and/or a hot plug mechanism.

FIGS. 11A–B depict example embodiments and comparisons of prefetch profiles and lookup tables for a scalable system.

FIG. 13 depicts an example table for operation of an inactivity timer as an embodiment of a timer mechanism as well as comparisons for different tables and for operation without a timer.

Elements shown in the Figures are presented as examples, and do not show all embodiments that are possible.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description. References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may. In various places, multiple copies of an item are referred to with the designation "A", "B", "C", etc. Any characteristics attributed to any one of the designated items (e.g., item 120A) may also be attributed any of the like items (e.g., item 120B).

In various embodiments of the invention, in a coherent scalable switch with multiple scalability ports, distributed coherency interleaves, and a crossbar interface, a shared bypass bus permits data transfer between the scalability ports and the coherency interleaves while bypassing the crossbar interface. Some embodiments may comprise scalable switches to support one or more sets of processors with substantially independent snoop or cache coherency paths or arrangements.

Figure 1:
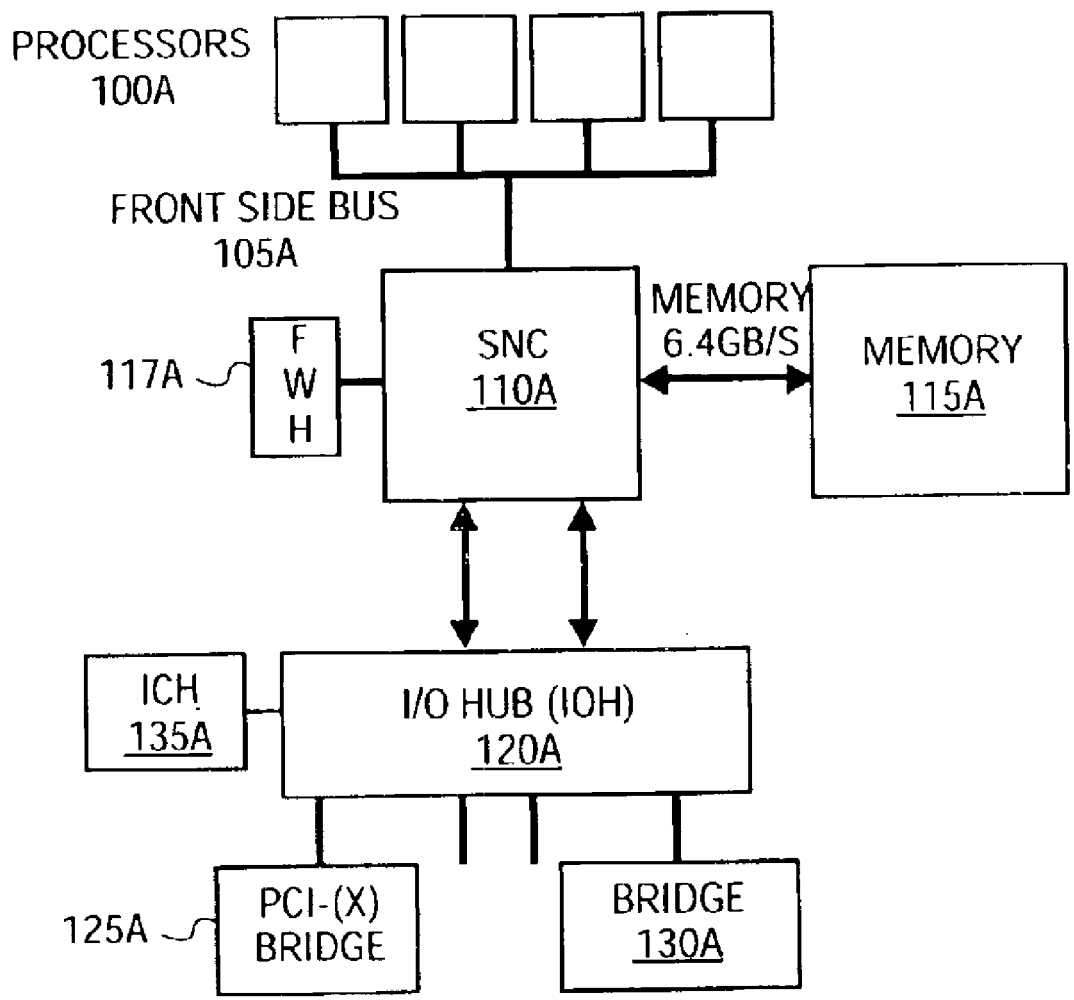
FIGS. 1–4 depict embodiments of a scalable system.

Referring now to FIG. 1, there is shown an embodiment that may comprise a single-bus shared memory architecture supporting up to four processors. Another embodiment may support a distributed shared memory architecture up to 16 or more processors. Other embodiments are also possible.

In such a single-bus shared memory system, the processors 100A and the memory controller in scalable node controller (SNC) 110A, may be attached to a common bus, front side bus 105A. This architecture may provide good performance and low cost and may be well suited for low-end servers. Each of processors 100A may have a private cache and may use the internal bus interface unit to monitor memory accesses on the bus. For this reason, a cache coherency protocol that may be used in these systems may be called a snooping protocol.

The embodiment shown may comprise two main components: Scalable Node Controller (SNC) 110A and the I/O Hub (IOH) 120A. The SNC 110A may support one to four processors 100A and may interface directly or substantially directly to the processors' Front Side Bus 105A. The main memory controller in the SNC 110A may support four memory channels. A double data rate (DDR) memory hub (DMH) on each memory channel may control eight DDR dual in-line memory modules (DIMM). The SNC 110A may also interface to a Firmware Hub (FWH) 117A, which may serve as a boot ROM for the system.

The SNC 110A may couple to the IOH 120A through a pair of Scalability Ports (SP). Each SP may provide 3.2 GB/s of bandwidth in each direction. The IOH 120A may support four Hub interfaces to connect to various bridges, such as a PCI/PCI-X bridge 125A and/or Infiniband® bridge 130A. A narrower version of the Hub interface may support legacy I/O devices 135A.

Figure 2:
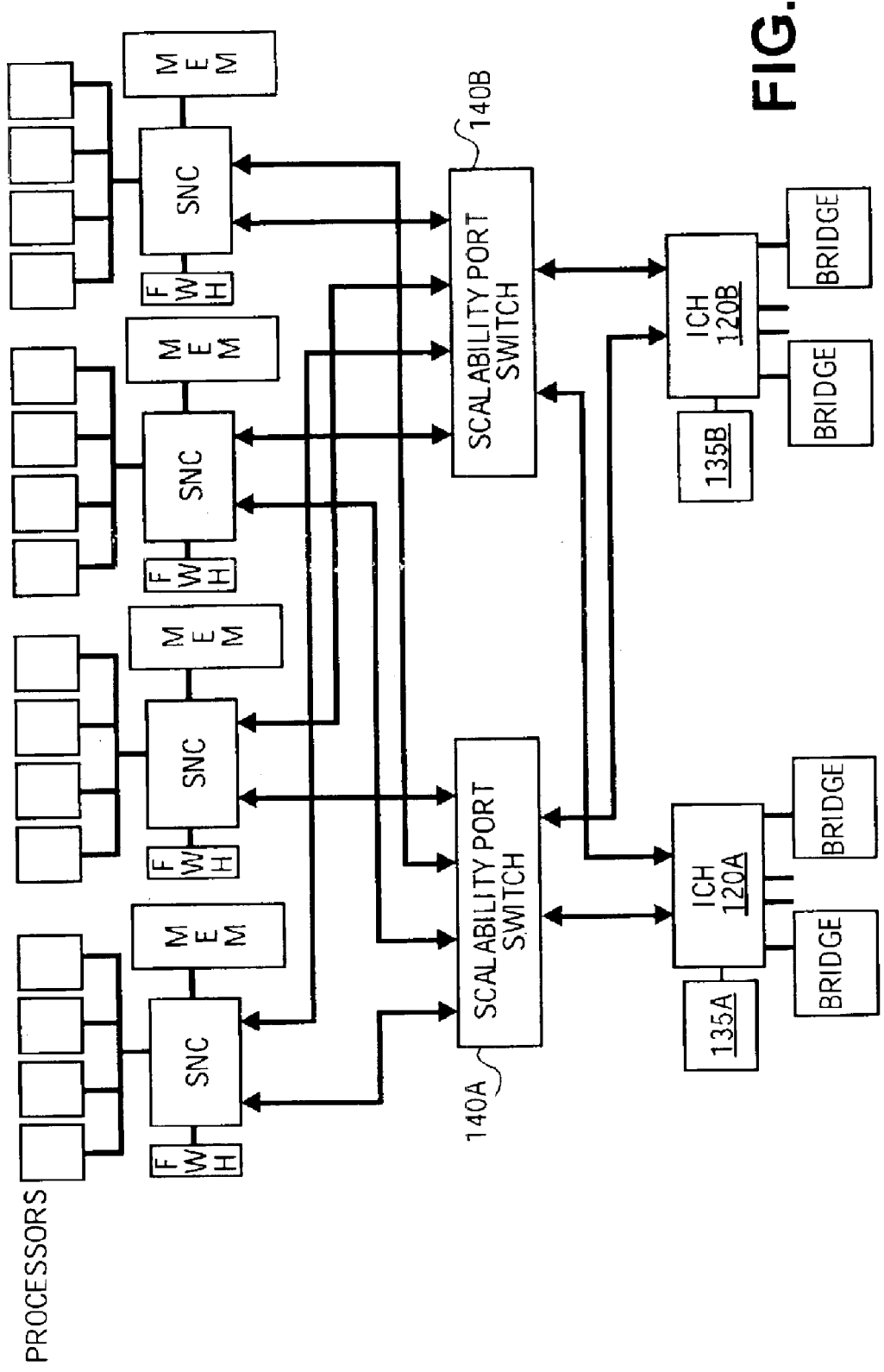

The embodiment of FIG. 1 may be limited by the bandwidth and the electrical limits of Front Side Bus 105A. FIG. 2 shows an embodiment with a multi-node scheme where clusters of multiple processors may be interconnected with Scalability Port Switch (SPS) 140A and SPS 140B for the illustrated embodiment of a 16-processor configuration.

SPS 140A and 140B may provide the interconnection and coherency support for building multi-node multiprocessor systems. SPS 140A, for instance, may comprise six SP interfaces to interconnect the SNC and IOH components.

In multi-node configurations, memory may be distributed physically across nodes but may also be visible from all processors as a single physical and/or logical address space. In some embodiments, multi-node systems may provide the programming simplicity of shared memory architectures.

Distributed memory architectures may exhibit significant difference in latency on local and remote memory accesses, sometimes by an order of magnitude. In some embodiments, software optimizations may mitigate the large remote to local accesses by moving or copying pages to the local memory. On the other hand, the ratio of remote to local latency in other embodiments, such as a multi-node configuration may be about 2.2, which may not require such software optimizations for scalable performance.

Figure 3:
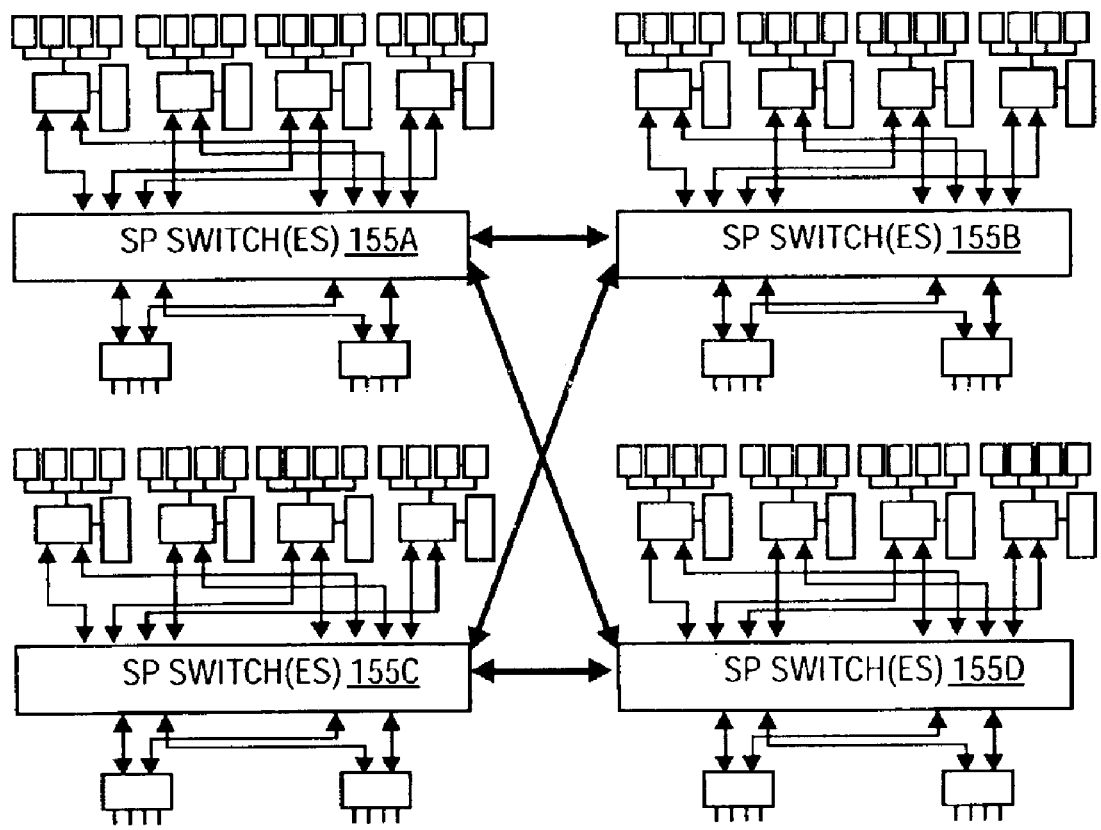

The SP protocol may be designed for scalability and such a protocol may facilitate the design of specialized switch components to build large scale coherent multi-chassis systems. FIG. 3 depicts a 64 processor configuration where four 16-processor chassis are interconnected through dedicated point-to-point links.

Figure 4:
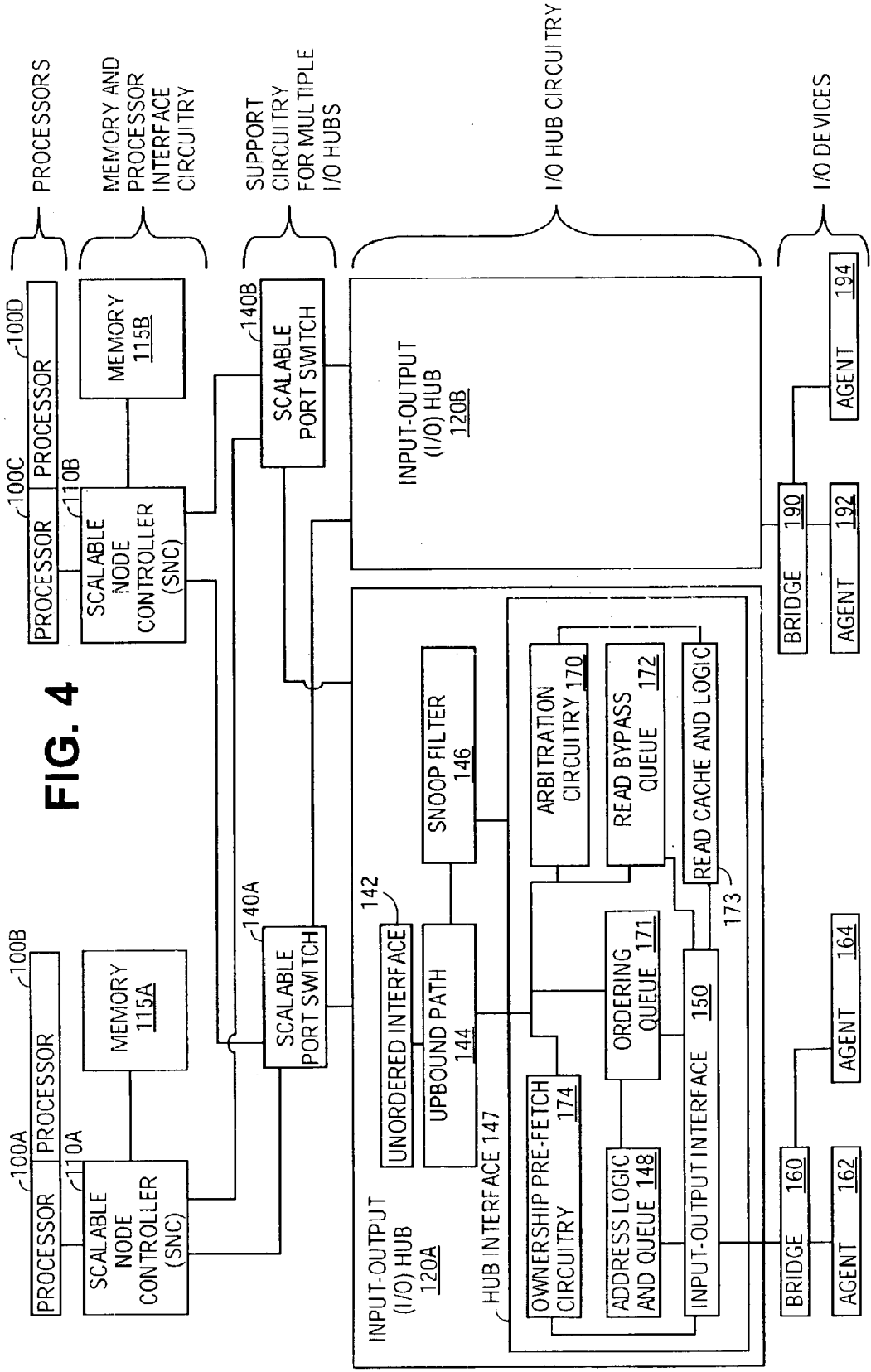

Referring now to FIG. 4, there is shown an embodiment of a scalable system. The embodiment may comprise processors such as processors 100A–D; processor interface circuitry, such as scalable node controllers 110A–B; memories 115A–B; I/O hub circuitry such as I/O hubs 120A–B; and I/O devices such as bridges 160 and 190 connected to agents 162, 164, 192 and 194. In embodiments that may comprise more than one I/O hub, such as I/O hubs 120A and 120B, support circuitry may couple the processor interface circuitry with the multiple hubs to facilitate transactions between I/O hubs 120A–B and processors 100A–D.

Scalable node controllers 110A and 110B may couple with processors 100A–B and 100C–D, respectively, to apportion tasks between the processors. In some of these embodiments, a scalable node controller 110A may apportion processing requests between processor 100A and processor 100B, as well as between processors 100A–B and processors 10C–D, for instance, based upon the type of processing request and/or the backlog of processing requests for the processors 100A–B and processors 100C–D.

In several embodiments, scalable node controller 110A may also coordinate access to memory 115A between the processors 100A–B and the I/O hubs 120A–B. The support circuitry for multiple I/O hubs, such as scalability port switches 140A and 140B, may direct traffic to scalable node controllers 110A and 110B based upon a backlog of transactions. In addition, scalability port switches 140A and 140B may direct transactions from scalable node controllers 110A and 110B to I/O hubs 120A and 120B based upon destination addresses for the transactions. In many embodiments, memory 115A and memory 115B may share entries, or maintain copies of the same data. In several embodiments, memory 115A and memory 115B may comprise an entry that may not be shared so a write transaction may be forwarded to either memory 115A or memory 115B.

SNC 110A, as well as SNC 110B, may comprise a central component in the processor/memory sub-system. SNC 110A may comprise interfaces to the processors 110A and 110B, the memory 115A, a firmware interface, and two-scalability ports for accesses to I/O. In some embodiments, features of the SNC 110A may comprise: support for up to four processors; 200 MHz DDR SDRAM support through a DDR Memory Hub (DMH) interface; two SPs to connect to the SPS 140A and 140B or the IOH 120A and 120B; and support for 32 DIMMs resulting in up to 128 GB per SNC 110A and 110B with 1 Gigabit (Gb) DDR devices.

In several embodiments, SNC 110A may comprise four high-speed point-to-point links to four DMHs that connect to components such as DDR DRAM components. In many of these embodiments, the four links may provide a peak memory bandwidth of 6.4 GB/s per node. SNC 110A may also buffer up to 8 KB of write data to prioritize reads over writes.

In further embodiments, SNC 110A may also implement interleaving and reordering to improve bandwidth and/or to reduce latency. Interleaving sequential accesses across many banks may optimize throughput and may minimize the effect of overhead. Reordering may allow conflict-free accesses to bypass requests to busy banks. Accesses may be sorted into four queues to minimize timing conflicts between accesses. If accesses are within a particular address range, they may be sorted by channel, then by least significant bank bit. Otherwise, they may be sorted by bank. An arbiter may choose from among the conflict-free accesses at the head of the four re-ordering queues. In many embodiments, these re-ordering policies may be chosen heuristically, deterministically, or by other techniques.

Figure 5:
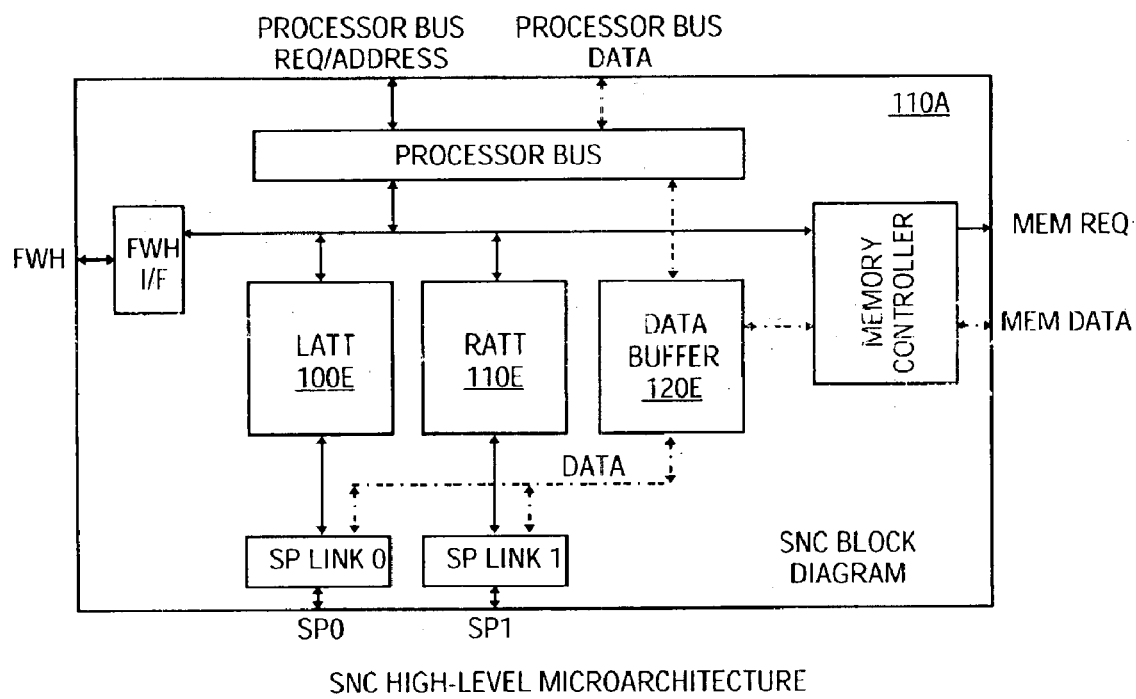
FIG. 5 depicts an embodiment of a Scalable Node Controller.

As shown in the embodiment of an SNC in FIG. 5, SNC 110A may comprise three main units: local access transaction tracker (LATT) 100E, remote access transaction tracker (RATT) 110E, and Data Buffer 120E. LATT 100E may track processor requests. LATT 100E may convert processor requests to SP or memory controller requests and may return responses to the processors 100A–D.

RATT 110E may track inbound transactions from Scalability Ports until the necessary snoops and/or memory accesses are complete. Further, Data Buffer 120E may transport and may hold data between the processor bus, memory interface, and the SP interfaces.

In still further embodiments, SNC 110A and/or 110B may comprise a hot page mechanism to tune memory latency, as described below. Multi-node configurations may feature a shorter latency for local memory accesses. In such embodiments, which may include software that may comprehend processor affinity and may be tuned to favor local memory accesses, performance may be enhanced or potentially optimized. To aid software in optimizing for local accesses, the SNC 110A, for instance, may contain some memory that may track and count the number of accesses to each of more than one address location or range of address locations (the granularity may be programmable). This mechanism, referred to herein as the hot page mechanism, may track local or remote accesses. For example, a software developer may use a hot page mechanism to identify hot spots in the memory that is being accessed by remote nodes and may optimize or enhance the software to move those accesses to the local node. The hot page mechanism may also be used for other forms of software optimizations.

In some embodiments, SPS 140A (shown in FIG. 4) may comprise a coherent interconnect switch that connects SNC 110A, SNC 110B, SPS 140B, I/O Hub 120A, and I/O Hub 120B through the Scalability Ports (SP). In one embodiment, some features of the SPS 140A may comprise: six identical Scalability Ports with a total peak bandwidth of 38.4 GB/s; an Integrated snoop filter that may track the state of one or more cache lines in processor and IOH caches which may reduce snoop probes to remote nodes and may support an SP cache consistency protocol; and an Internal interconnect that may comprise a crossbar and network of buses for critical coherent traffic.

Optimizations or improvements such as the network of buses in SPS may minimize the latency. For example, a shared crossbar bypass bus structure may be incorporated into SPS to provide an independent path for SP to coherency interleave transactions and vice versa. As a result, cache look up and update operations may not be delayed as a result of, for example, data streaming. In some embodiments, the shared crossbar bypass bus structure may comprise parallel bits, a data valid qualifier, a virtual channel qualifier, and a multi-bit destination qualifier. For example, a coherency interleave or SP with data to send may assert its request-channel arbitration request or its response-channel arbitration request, according to the type of data to be sent. The unit may also transmit its data locally to bus multiplexors and may assert its valid signal. This data may be propagated onto the shared bus by the multiplexors after the arbiter selects this coherency interleave or SP.

Based upon the current set of requests and a least-recently-used, round-robin priority, and possibly on the receivers' ready signals, the arbiter may select one of the requesting units to own the bus in the next clock cycle. (Note: during idle conditions, one of the transmitters may always be "selected" as well). The arbiter may send control signals to the bus multiplexors, and may send a selected signal to the transmitter that has; been selected. Various types of arbiters are well-known and are not further described herein to avoid obscuring other aspects of the SPS.

After the transmitting coherency interleave or SP may observe by its selected signal and its targeted destination's ready signal that the data may have been transmitted and absorbed, the transmitting coherency interleave or SP may deassert its valid qualifier or may proceed to send new data.

Figure 6:
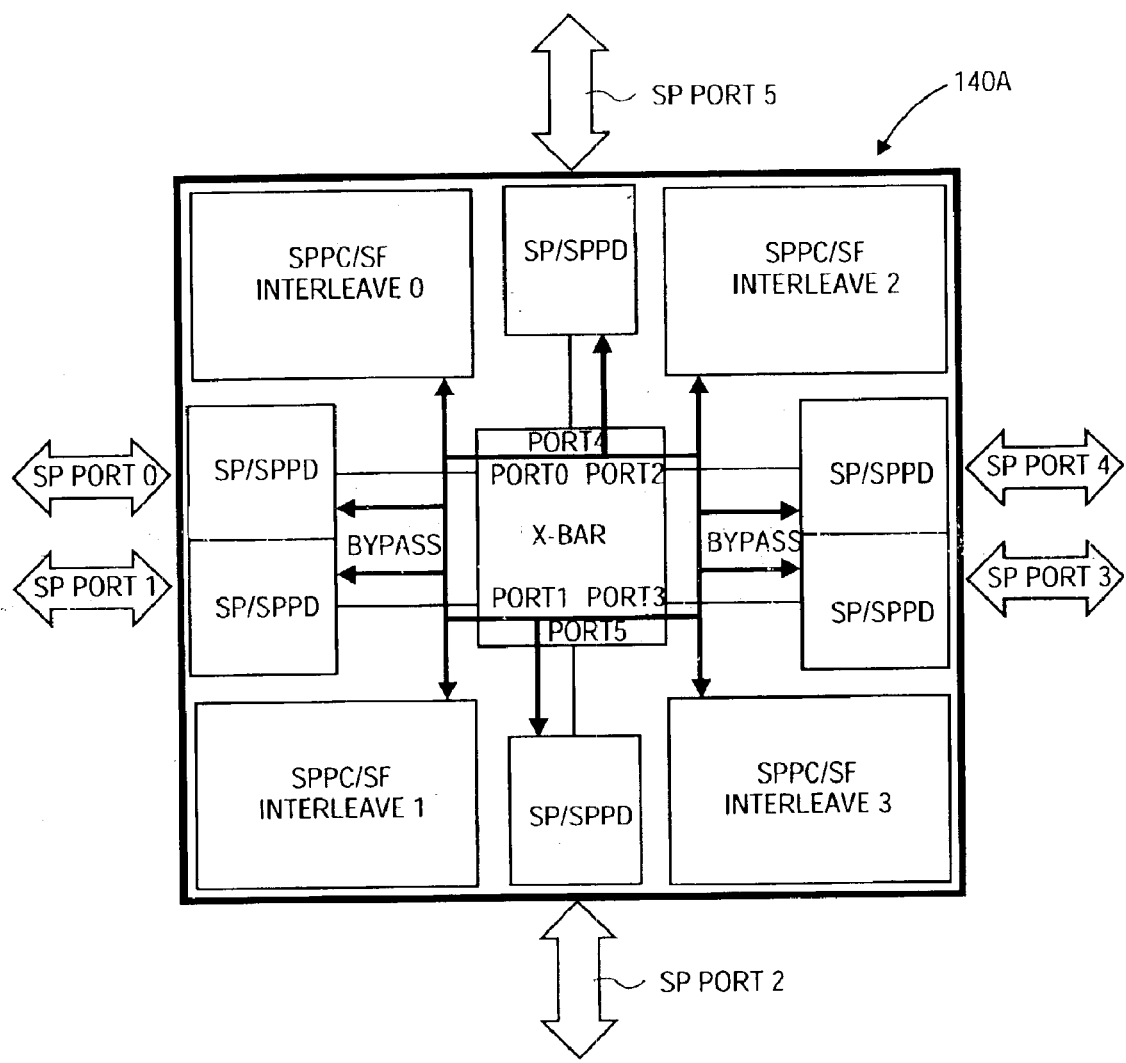
FIG. 6 depicts an embodiment of a Scalability Port Switch.

As shown in FIG. 6, an SP may implement the physical, link, and part of the protocol layers. The SP may comprise a point-to-point cache-consistent interface designed to build shared memory multiprocessor systems that may overcome the limitations of shared bus based architectures. The embodiment depicts four centralized SP protocol (SPPC) and snoop filter (SF) units, which are interleaved for improved throughput and ease of physical design, although they form one logical unit. All the ports and SPPC/SF interleaves may be coupled by a crossbar (X-Bar) and network of buses. In several embodiments, these buses may reduce latency on critical operations.

The physical layer may use pin-efficient simultaneous bidirectional signaling technology, where the same signal pins may be used to send signals in both directions in a full duplex manner. In other embodiments, the signal pins may be used to implement half duplex or other signaling technology. In several embodiments, the physical layer may comprise a source synchronous interface where the transmitter may send the clock along with the data and the receiver may use the clock to sample the data. A scalability port interface may be, for example, 40 bits wide, with 32 of those bits used for transmitting data, 2 bits used for link layer control information, and 6 bits used for maintaining data integrity. The interface may operate at various rates, for example 800 million transfers/sec, which may result in a peak bandwidth of 3.2 GB/sec per port in each direction. Further, in many embodiments, the scalability port may comprise a packetized interface, where requests and responses may be multiplexed on the same physical medium and wherein each packet may contain a header to route the packet and to specify the attributes of the packet. The effective bandwidth achieved on the interface, in one embodiment, may depend upon the distribution of packets of various sizes. The SP may also be capable of delivering an effective bandwidth of 80% of the peak.

The SP link layer may support virtual channels and may provide flow control and reliable transmission. SP may use two virtual channels to build independent request and response virtual interconnect on a single physical interconnect. In some embodiments flow control may be done using a credit-based scheme. The unit of flow control may comprise a flit (sub-packet) that is four-transfers long on the interface. The link layer may also be responsible for detecting transmission errors and may rely on a retry scheme using a modified version of "go-back-n" sliding window protocol for recovery.

The SP protocol layer may implement the state machines and may provide resources for functionality such as cache consistency, translation lookaside buffer (TLB) consistency, synchronization, interrupt delivery, etc. In several embodiments, the protocol layer may be designed to support both Itanium™ and Xeon™ processor families. The protocol may allow for high performance and flexible interconnect fabric by not relying on an ordered fabric for performance sensitive operations.

The SP consistency protocol may allow for cache lines to be in Modified, Exclusive, Shared or Invalid state (MESI) at the caching agents and may use an invalidation-based protocol. In some embodiments, the protocol may be built on the concept of sparse directory, called snoop filter, which may keep track of lines present in the caches rather than keeping track of all or many lines in memory. Such a protocol may allow for entire snoop filters to be stored on the same component as the directory state machine for high performance, which may not have been possible with a conventional directory. Separation of snoop filter from the memory agent may be allowed to facilitate the building block philosophy, for example, by allowing the use of node controllers and I/O hubs that may be designed for low cost systems. The building block philosophy may be supported efficiently through transactions that may access memory concurrently or substantially concurrently with coherency resolution. The protocol may also provide coherent transactions that may be optimized for I/O device operations. Conflict resolution on concurrent accesses to same cache line may be done in a relaxed and, in several embodiments, a distributed manner.

The Scalability Port consistency protocol may allow for extensions to large-scale systems through a second level distributed directory that may work in conjunction with a basic snoop filter.

The distributed SP protocol logic (SPPD) may perform address/request decoding to determine how packets may be routed in the SPS 140A and/or 140B. SPPD may control data transfers between ports including modified data transfers. The SPPC may comprise a programmable protocol engine that may process requests and responses and may spawn transactions. In some embodiments, SPPC may handle global ordering and may contain anti-starvation logic to guarantee fairness between nodes. The combined snoop filter tag array size may be 1 MB and may maintain the state of, for instance, approximately 200K cache lines. The combined snoop filter tag array may support up to 266M snoop filter lookup-and-update operations per second. In many embodiments, an entry may contain an address tag, a presence vector (one bit per node), the cache consistency protocol state (M/E, S, I), and ECC check bits.

I/O hubs 120A and 120B may operate to bridge transactions between an ordered domain and an unordered domain by routing traffic between I/O devices and scalability ports. Returning to FIG. 4, in some embodiments the I/O hubs 120A and 120B may provide peer-to-peer communication between I/O interfaces. In particular, I/O hub 120A may comprise unordered interface 142, upbound path 144, snoop filter 146, and a hub interface 147. The hub interface 147 may comprise arbitration circuitry 170, ordering queue 171, read bypass queue 172, ownership pre-fetch circuitry 174, address logic and queue 148, read cache and logic 173, and I/O interface 150.

The I/O hubs 120A and 120B may, in one embodiment, comprise a central component of the I/O subsystem of a server. Such an I/O hub may comprise a prefetch engine and read caches to deliver full bandwidth on data return; two SP interfaces to connect to either the SPSs 140A and 140B or the SNCs 110A and 110B; and hub interface 147 with a peak bandwidth of 1 (GB/s) gigabyte per second.

The I/O hubs 120A and 120B may support a building block philosophy, which may result in a flexible and configurable I/O subsystem. Many embodiments may also comprise components such as a legacy I/O controller hub (ICH), a PCI/PCI-X bridge, for example bridges 160 and 190, and a host controller adapter. Since I/O hubs 120A and 120B may interface a variety of different I/O bridges, the microarchitecture may be generically optimized for I/O traffic behavior.

Figure 7:
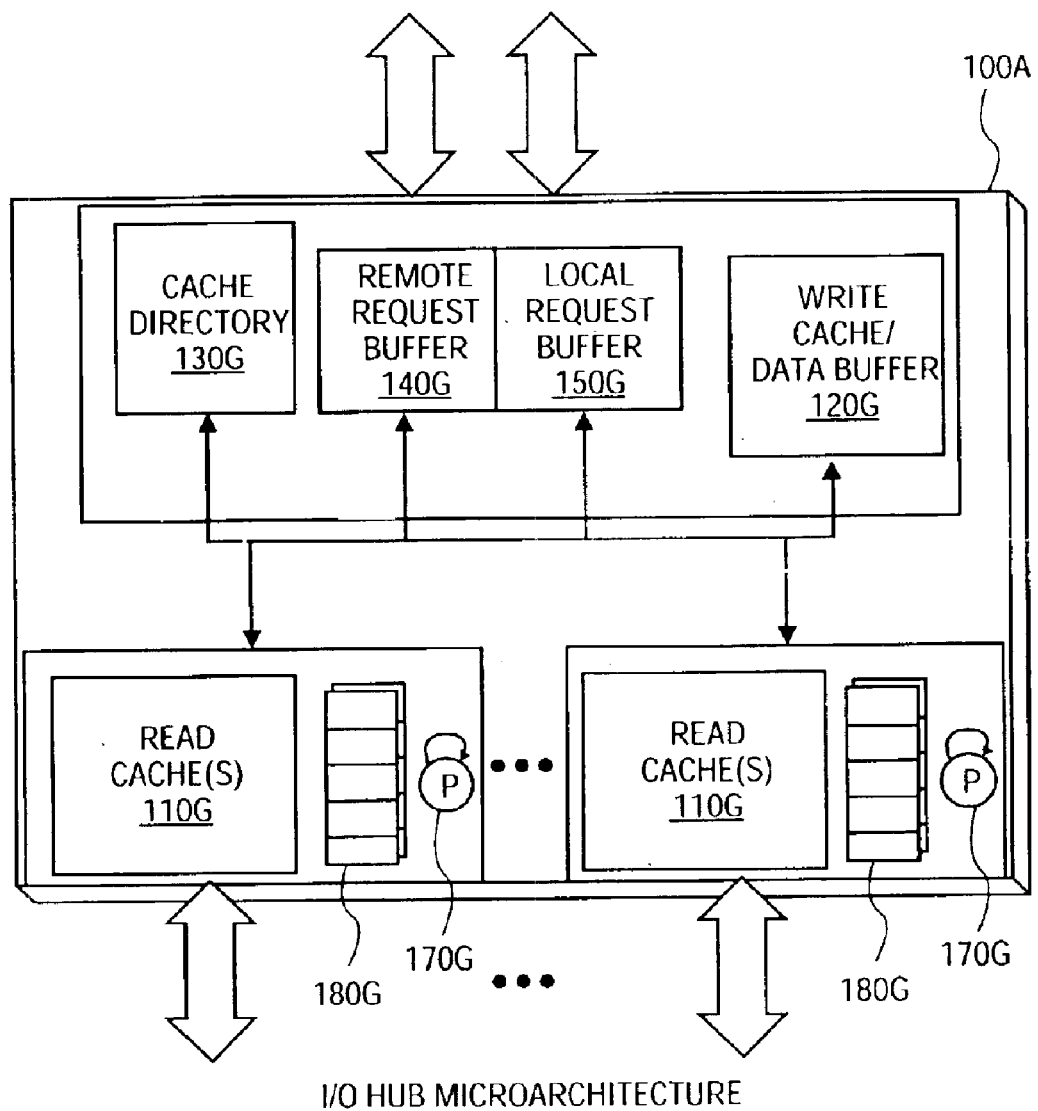
FIG. 7 depicts an embodiment of an I/O Hub.

Referring now to FIG. 7, there is shown a block diagram of the high-level microarchitecture embodiment of I/O hubs 120A and/or 120B. The I/O hub, generically shown as 100G, may have internal structures that may comprise Read Caches 110G, Write Cache and Data Buffer 120G, Cache Directory 130G, Local Request Buffer 150G and Remote Request Buffer 140G, Read Prefetch Engines 170G, and Ordering Queues 180G. Read Caches 110G may comprise, for example, a 4 KB Read Cache dedicated to a Hub Interface. In some embodiments, fully coherent read caches may allow an aggressive pre-fetching algorithm without exposure to stale data delivery. A 4 KB Read Cache may be sufficient, in many embodiments, to accommodate enough read pre-fetches to hide memory latency. Further, independent read caches may prevent the traffic characteristics of one Hub interface to interfere with the traffic characteristics of the other Hub interfaces.

Write Cache and Data Buffer 120G may comprise, for example, a write cache implemented in the I/O hub. In some embodiments, coherent write caching may promote combining of write data to a cache line granularity, potentially increasing the efficiency of the SP and decreasing snoop overhead on the system.

Cache Directory 130G may comprise a directory that may track the cache lines held in the multiple read caches 110G and the write cache 120G. The directory may also be responsible for tracking duplicate entries of shared lines.

Local Request Buffer 150G and Remote Request Buffer 140G may comprise buffers to track coherent transactions issued by the I/O hub (Local Request Buffer 150G) and coherent transaction issued by other components (Remote Request Buffer 140G). In some embodiments, the buffers may work together to detect access conflicts and may enforce cache consistency.

Read Prefetch Engines 170G may comprise mechanisms to dynamically pre-fetch memory lines on behalf of the interfacing I/O devices. In several embodiments, Read Prefetch Engines 170G may be optimized for traditional memory latencies so the I/O hub may be designed to prefetch beyond the requests issued by I/O devices for increased read bandwidth.

Ordering Queues 180G may take advantage of the Scalability Port's inherently unordered protocol. As a proxy for I/O devices which follow Producer-Consumer ordering rules, the I/O hub, for example, may increase or maximize performance by prefetching, pipelining, and parallelism.

Referring back to FIG. 4, unordered interface 142 may facilitate communication between I/O hub 120A and a scalable node controller such as 110A or 110B with circuitry for a scalability port protocol layer, a scalability port link layer, and a scalability port physical layer. In some embodiments, unordered interface 142 may comprise simultaneous bi-directional signaling. Unordered interface 142 may couple to scalability port switches 140A and 140B to transmit transactions between scalability node controllers 110A and 110B and agents 162 and 164. Transactions between unordered interface 142 and scalability node controllers 110A and 110B may transmit in no particular order or in an order based upon the availability of resources or the ability for a target to complete a transaction. The transmission order may not be based upon, for instance, a particular transaction order according to ordering rules of an I/O interface, such as a PCI bus. For example, when agent 162 may initiate a transaction to write data to a memory line, agent 162 may transmit four packets to accomplish the write. Bridge 160 may receive the four packets in order and forward the packets in order to I/O interface 150. Ordering queue 171 may maintain the order of the four packets to forward to the unordered interface 142 via the upbound path 144. Scalability port switch 140A may receive the packets from unordered interface 142 and transmit the packets to memory 115A and memory 115B.

Upbound path 144 may comprise a path for hub interface 147 to issue transactions to the unordered interface 142 and to snoop filter 146. For example, upbound path 144 may carry inbound coherent requests to unordered interface 142, as well as ownership requests and read cache entry invalidations from ownership pre-fetch circuitry 174 and read cache and logic 173, respectively, to snoop filter 146. In many embodiments, upbound path 144 may comprise a pending transaction buffer to store a pending transaction on the unordered interface 142 until a scalability port switch 140A or 140B may retrieve or may be available to receive the pending transaction.

Further, when an I/O hub such as I/O hub 120A may couple more than one transaction queue, such as ordering queue 171 and read bypass queue 172, to scalability port switches 140A and 140B, hub interface 147 may comprise arbitration circuitry 170 to grant access to upbound path 144. In many embodiments, the arbitration circuitry 170 may provide substantially equivalent access to the unordered interface 142. In other embodiments, the arbitration circuitry 170 may arbitrate between the ordering queue 171 and the read bypass queue 172 based upon a priority associated with, or an agent associated with, an enqueued transaction.

Snoop filter 146 may issue ownership requests on behalf of transactions in ordering queue 171, return ownership completions, monitor pending transactions on unordered interface 142, and respond to downbound snoop requests from the unordered interface 142 or from a peer hub interface. In addition, snoop filter 146 may perform conflict checks between snoop requests, ownership requests, and ownerships of memory lines in memory 115A or memory 115B. For example, a write transaction waiting at ordering queue 171 to write data to memory line one in memory 115A may reach a top of ordering queue 171. After the write transaction for memory line one may reach the top of ordering queue 171, hub interface 147 may request ownership of memory line one for the write transaction via snoop filter 146. Snoop filter 146 may perform a conflict check with the ownership request and determine that the ownership request may conflict with the ownership of memory line one by a pending write transaction on unordered interface 142. Snoop filter 146 may respond to the ownership request by transmitting an invalidation request to hub interface 147.

Subsequently, hub interface 147 may reissue a request for ownership of memory line one for the write transaction and snoop filter 146 may perform a conflict check and determine that no conflict exists with an ownership by the write transaction. Then, snoop filter 146 may transmit a request for ownership to scalable node controller 110A via scalability port switch 140A. In response, snoop filter 146 may receive an ownership completion for memory line one and may return the ownership completion to hub interface 147. In some embodiments, hub interface 147 may receive an ownership completion for a transaction and may modify the coherency state of the transaction to 'exclusive'. In several of these embodiments, snoop filter 146 may maintain the coherency state of the transaction in a buffer.

Hub interface 147 may maintain a transaction order for transactions received via I/O interface 150 in accordance with ordering rules associated with bridge 160. Hub interface 147 may also determine the coherency state of transactions received via I/O interface 150. For example, hub interface 147 may receive a write transaction from agent 164 via bridge 160 and place the header for the write transaction in ordering queue 171. Substantially simultaneously ownership pre-fetch circuitry 174 may request ownership of the memory line associated the write transaction via snoop filter 146. The ownership request may be referred to as ownership pre-fetching since the write transaction may not satisfy ordering rules associated with I/O interface 150. In alternate embodiments, when the ordering queue 171 is empty and no transactions are pending on the unordered interface 142, the write transaction may bypass ordering queue 171 and transmit to upbound path 144 to transmit across unordered interface 142.

Snoop filter 146 may receive the request for ownership and perform a conflict check. In some instances, snoop filter 146 may determine a conflict with the ownership by the write transaction. Since the coherency state of the write transaction may be pending when received, snoop filter 146 may deny the request for ownership. After the transaction order of the write transaction may satisfy ordering rules, or in some embodiments after the write transaction reaches the top of ordering queue 171, hub interface 147 may reissue a request for ownership. In response to receiving an ownership completion for the write transaction, hub interface 147 may change the coherency state of the write transaction to 'exclusive' and then to 'modified'. In some embodiments, when the transaction may be at the top of ordering queue 171 upon receipt of an ownership completion, hub interface 147 may change the coherency state of the write transaction directly to 'modified', making the data of the write transaction globally visible. In several embodiments, hub interface 147 may transmit the transaction header of the write transaction to snoop filter 146 to indicate the change in the coherency state to 'modified'.

On the other hand, when the hub interface 147 receives the ownership completion in response to pre-fetching the ownership, hub interface 147 may change the coherency state of the write transaction to 'exclusive' and maintain the transaction in 'exclusive' state until the write transaction may satisfy the corresponding ordering rules, unless the ownership may be invalidated, or stolen. For example, the ordering rules governing transactions received via bridge 160 from agent 162 may be independent or substantially independent from ordering rules governing transactions received from agent 164. As a result, many embodiments allow a second transaction to steal or invalidate the ownership of the memory line by a first transaction to transmit to upbound path 144 when the ordering of the second transaction is independent or substantially independent from the ordering of the first transaction. Ownership stealing may prevent backup, starvation, deadlock, or stalling of the second transaction or the leaf comprising the second transaction as a result of the first transaction. In many of these embodiments, ownership may be stolen when the first transaction may reside in a different leaf from the second transaction and/or in the same leaf.

In the present embodiment, read bypass queue 172 may provide a substantially independent path to the unordered interface 142 for read transactions that may be independent of ordering rules associated with transactions in ordering queue 171. Read bypass queue 172 may receive read transactions from the I/O interface 150 or may receive transactions from ordering queue 171. As a result, the embodiment may take advantage of the unrelated transaction ordering between the agent 162 and agent 164 or between read and write transactions from agent 162 and/or agent 164. For example, agent 162 may request a read of memory line one of memory 115A. Address logic and queue 148 may determine that a transaction, such as a write transaction, associated with memory line one is in the ordering queue 171. Hub interface 147 may forward the read transaction to ordering queue 171 to maintain a transaction order according to an ordering rule associated with agent 162. Afterwards, snoop filter may apply backpressure to read transactions from hub interface 147 until a pending read transaction in the snoop filter 146 may be transmitted across the unordered interface or until the ordering queue 171 may be flushed. The transactions of ordering queue 171 may be processed until the read transaction from agent 162 reaches the top of ordering queue 171. While backpressure may be applied to the read transaction from snoop, filter 146, the read transaction may not be forwarded to snoop filter 146. In response, hub interface 147 may forward the read transaction to the bottom of read bypass queue 172. The read transaction may be forwarded to read bypass queue 172 to allow subsequently received write transactions to continue to transmit to the unordered interface 142. In addition, by reaching the top of ordering queue 171, the transaction order of the read transaction may have satisfied the ordering rules associated with agent 162 so the read transaction may proceed in a path independent from the ordering rules associated with ordering queue 171.

In many embodiments, I/O caching and adaptive pre-fetching of memory lines for read cache, such as read cache and logic 173 may be implemented in I/O hub 120A may comprise implementing an integrated caching and prefetch mechanism to provide high I/O throughput. Pre-fetching cache lines may hide round trip memory read latency and may save a read request from traversing through, for example, the chipset to memory 115A and back.

Adaptive pre-fetch and throttling, for instance, may utilize an adaptive algorithm with two or more dynamic profiles (conservative and aggressive in one embodiment) to pre-fetch cache lines speculatively. Pre-fetching of cache lines may be initiated after the initial request for a given stream is serviced. A stream may comprise a sequence of contiguous address requests to an I/O hub 120A or 120B. Subsequent read requests from the stream that may hit the read cache (possibly from the pre-fetched data) may be sent back or responded to without incurring upstream latency. A pre-fetch engine of logic circuitry in read cache and logic 173 may have the ability to sense traffic, like real time traffic, and modify its pre-fetch cache request generation rate for different I/O modes and may switches from one profile to another based on the prevailing conditions. In many embodiments, the degree of pre-fetching of cache lines may vary with the number of available streams for a given prefetch profile. For instance, if only one stream exists and the prefetch profile may be set to "aggressive," then up to eight cache lines may be pre-fetched. If the number of streams increases to two, then one or each stream may be limited to a maximum of four cache lines. Pre-fetching cache lines may continue as long as the stream may still be allocated and an upper throttle limit may not have been reached. In several embodiments, this adaptive self-regulation may comprise a trade-off between pre-fetching enough data for cache to stream and not wasting the memory bandwidth excessively.

In some embodiments, cache such as the read cache of read cache and logic 173 may comprise a unified, logically and/or physically, cache to enhance performance across one or more streams with an amount of cache space, by dynamically allocating cache space to streams of reads or writes. In such embodiments, high streaming bandwidth performance may be accomplished with a smaller cache size than conventional cache. For example, if a bus such as a PCI bus may facilitate two kilobytes (KB) of cache for streams via bridge 160 to I/O hub 120A, with up to four streams, hub interface 147 may comprise a unified cache with one or more cache or buffers comprising a total of two KB. After stream one may be initiated, read cache and logic 173 may allocate one KB of the unified cache to stream one for real and/or speculative read requests, wherein a real read request may result from an actual request received from bridge 160 and a speculative read request may be initiated by the pre-fetch cache engine of read cache and logic 173. After a stream two may become active, read cache and logic 173 may allocate 0.75 KB to cache for stream two. Substantially simultaneously, read cache and logic 173 may reduce the cache space available to stream one from one KB to 0.75 KB, leaving 0.5 KB of space for a subsequently active stream. In situations wherein stream one and stream two remain active and stream three becomes active, read cache and logic 173 may allocate 0.5 KB of cache to stream three and de-allocate 0.25 KB of cache from stream one and from stream two. Upon de-allocation of the 0.25 KB from both stream one and stream two, 0.5 KB of cache may remain available for a stream four.

Depending upon streaming scenarios for I/O hub 120A, the cache sizes and stream allocations may be adjusted. For instance, some embodiments may comprise more than one leaf in I/O hub 120A and streams may be initiated on either leaf. In some of these embodiments, a unified cache may be allocated for each leaf. In other embodiments, a unified cache may be sized for caching of streams from both leaves. In still further embodiments, the unified cache may be partitioned dynamically between leaves or combined into a unified cache dynamically for two or more leaves.

In many embodiments, a timing mechanism such as programmable timer may enhance the operation of pre-fetching cache by determining the number of active streams. For example, adaptive pre-fetch and throttling may allocate cache space, such as cache space of a unified read cache, based upon a number of streams concurrently or substantially concurrently requesting data so the efficiency of the cache allocation may be based upon the accuracy of the count of streams. On a bus such as a PCI (peripheral interconnect interface) bus, a stream may end without an indication to that effect being transmitted to I/O hub 140. Read cache and logic 173 may continue to allocate cache to the stream and may also continue to pre-fetch cache lines for the stream. After the stream may terminate, the speculative cache line pre-fetch requests may unnecessarily use bandwidth upstream in addition to the memory. As a result, many embodiments may comprise the timing mechanism to terminate a stream based upon inactivity.

A timing mechanism may measure the time between a first request and a second request of the stream and after the time exceeds a certain time, the stream may be considered to have terminated. A balance between maintaining allocation and bandwidth may be balanced with increased performance resulting from cache allocation and speculative pre-fetching in a determination of the time selected for such as timing mechanism. The time selection may also be based upon the latency, average or nominal, for receiving a completion from an upbound read request.

In still further embodiments, ordering queue 171 and read bypass queue 172 may comprise memory interleaving and reordering to increase memory throughput. Coherent I/O caches and pre-fetching may hide I/O read latency, even in the large multi-node configurations and the snoop filter may reduce overall latency and may eliminate unnecessary snoop traffic.

Memory request reordering may attenuate a number of dead cycles on the memory data bus induced by a DDR/DRAM protocol. One of the largest dead cycle penalties may be caused by a page replace, also called a page miss. For example, a page replace may happen after two consecutive requests go to different pages on the same DIMM. In this scenario, the second request may be delayed for the duration to close the previously activated page before activating the page for the next request. With some DIMMs, this duration may be 70 ns. In addition, there may be turnaround penalties of one cycle (e.g., 10 ns) on switching from read to write or vice-versa or when read data comes from different DIMMs on the same DDR channel.

In embodiments wherein memory requests may be placed in ordering queue 171, like a FIFO queue and processed in-order, the protocol induced inefficiencies may reduce sustained bandwidth significantly for random stream of requests typical of server workloads. However, when requests may be re-ordered to avoid conflicts, the sustained bandwidth and the average read latency may be improved.

Performance trade-off for the SNC and memory subsystem may be selected by using a detailed micro-architecture simulation model. Many different queue structures, queue assignments, re-ordering and other arbitration policies, and workloads may also facilitate selection of a queue structure and policies.

Ownership pre-fetch circuitry 174 may pre-fetch ownership of memory contents associated with a memory line after a transaction is received by I/O interface 150 and may prevent ownership from being pre-fetched in response to a signal from or not receiving a signal from address logic and queue 148. For instance, hub interface 147 may receive two write transactions from agent 162 to write data to the same memory line(s). After the first write transaction is received at I/O interface 150, ownership pre-fetch circuitry 174 may initiate a request for ownership of the memory line(s) associated with the first write transaction. Subsequently, I/O interface 150 may receive the second write transaction. Ownership pre-fetch circuitry 174 may receive a signal, or may not receive a signal in some embodiments, to indicate that ownership of the memory line(s) associated with the second write transaction may not be pre-fetched for the second transaction.

Address logic and queue 148 may maintain a list of pending transactions in hub interface 147 and/or I/O hub 120A, depending upon the embodiment, and may compare an address of an upbound transaction to the list to determine whether ownership may be pre-fetched for the transaction and/or the upbound transaction may be subject to independent ordering rules from a transaction in the ordering queue 171. In some embodiments, read transactions may comprise more than one address that may subject the read transaction to more than one ordering rule or set of ordering rules. For example, agent 162 may initiate a first write transaction to write to memory line one, a second write transaction to write to memory line one, and a first read transaction to read from memory line one. Then, agent 164 may initiate a second read transaction to read from memory line one. The I/O interface 150 may receive the first write transaction and address logic and queue 148 may determine that no address in an address queue of the address logic and queue 148 may match memory line one and may transmit a signal to ownership pre-fetch circuitry 174 to pre-fetch ownership of memory line one for the first write transaction.

In response to receiving the second write transaction, address logic and queue 148 may determine that the address is owned by the first write transaction, which is ahead of the second write transaction with regards to transaction order, and may transmit a signal to ownership pre-fetch circuitry 174 to indicate that ownership may not or should not be pre-fetched for the second write transaction. The I/O interface 150 may receive the first read transaction and address logic and queue 148 may determine that the first read may follow the first and second write transactions in a transaction order since agent 162 also initiated the first read transaction. Hub interface 147 may forward the first read transaction to the bottom of ordering queue 171. Then, I/O interface 150 may receive the second read transaction. The second read transaction also performs an action on memory line one, but, in the present embodiment, address and queue logic 148 maintains an address associated with pending transactions that comprises the address of the source agent or a hub ID representing one or more source agents, such as agent 162 for the first and second write transactions and the first read transaction. Since the hub ID of the second read transaction may be different from the hub ID's associated with the first and second write transactions and the first read transaction, the second read transaction may advance toward the unordered interface 142 along an independent path, e.g. the read bypass queue 172, bypassing the first and second write transactions and the first read transaction. In other situations, however, read cache and logic 173 may attach cache line invalidation data to the second read transaction and in response to a match between the address associated with the cache line invalidation data and an address of a pending transaction, such as memory line one, the second read transaction may be forwarded to the bottom of the ordering queue 171 rather than the bottom of the read bypass queue 172. In alternative embodiments, address logic and queue 148 may not maintain an address or ID associated with the source agent so determinations for ownership pre-fetching and/or bypassing may be made based upon the memory line(s) associated with a transaction.

Read cache and logic 173 may review a transaction after the transaction is received by I/O interface 150. In some embodiments, read cache and logic 173 may recognize a read transaction for a memory line, may determine whether the read cache and logic 173 stores a valid cache line comprising a copy of the memory line, and may respond to the read transaction after determining that read cache and logic 173 stores a valid cache line comprising a copy of the memory line. In other situations, read cache and logic 173 may not comprise the valid cache line and, in many embodiments, read cache and logic 173 may then attach cache line invalidation data to the read transaction to clear space to store the data received in response to the read transaction.

The cache line invalidation data may be forwarded to the snoop filter 146 to maintain synchronization between the read cache coherency states and the coherency states stored in the snoop filter 146. The cache line invalidation data may comprise or be associated with an entry in the cache of read cache and logic 173 and the address of the memory line associated with the entry. In many embodiments, the cache line invalidation data may be designed to instruct the snoop filter to invalidate an association between an address in the snoop filter 146 and an entry in the read cache. For example, read cache and logic 173 may store a cache version of memory line one and I/O interface 150 may receive a read transaction for memory line two. When read cache and logic 173 may not comprise a copy of the latest version of memory line two, read cache and logic 173 may clear room in cache for memory line two. In several embodiments, read cache and logic 173 may invalidate the oldest and/or least used data in cache, such as memory line one, to make room for a copy of memory line two. In many of these embodiments, read cache and logic 173 may insert an invalidation request for the copy of memory line one into the header for the read transaction of memory line two. As a result, the data of the read completion for memory line two may be stored over the entry for memory line one. Snoop filter 146 may receive the invalidation request after the read transaction may reach the snoop filter 146 and may return a copy of the data from the read completion to read cache and logic 173. In some embodiments, read cache and logic 173 may further store data of a write transaction, or other memory lines near the memory line subject to the read transaction, into cache in anticipation of a read transaction for the same memory line(s).

In the present embodiment, bridges 160 and 190 couple one or more agents 162, 164, 192, and 194 to the I/O hubs 120A and 120B from an ordered domain such as a peripheral component interconnect (PCI) bus, a universal serial bus (USB), or an infiniband channel. The agents 162, 164, 192, and 194 may transact upbound or peer-to-peer via I/O hubs 120A and 120B. In many of these embodiments, agents 162, 164, 192, and 194 may transact with any processor and any of processors 100A–D may transact with any agent.

Redundancy may be provided in the architecture, enabling fast reset and reboot in a degraded mode in the event of a component or interconnect failure. For example, if an SP interface fails, the system is reset and reconfigured to use only one SPS switch. In a degraded mode, system performance may be impacted.

The SPS may be designed to support partitioning of the system into, for example, two domains. A domain may be a "system within a system", that is, a domain may have its own instance of the operating system. A domain may support independent reset, independent error status and signaling, etc. Any two or more ports may be allocated to a domain (both an SNC and I/O hub may be present in a domain).

In many embodiments, partitioning may be accomplished by configuring the SPS (via firmware setup, using a remote management console, or the like) during system initialization. Once the system is partitioned, processor/memory nodes or I/O nodes may be moved from one partition to the other using the node hot plug capabilities. An example of the user benefits of domain partitioning combined with node hot plug is depicted in the table in FIG. 8, in which RAS is an acronym for Reliability, Availability, and Serviceability.

Figure 9:
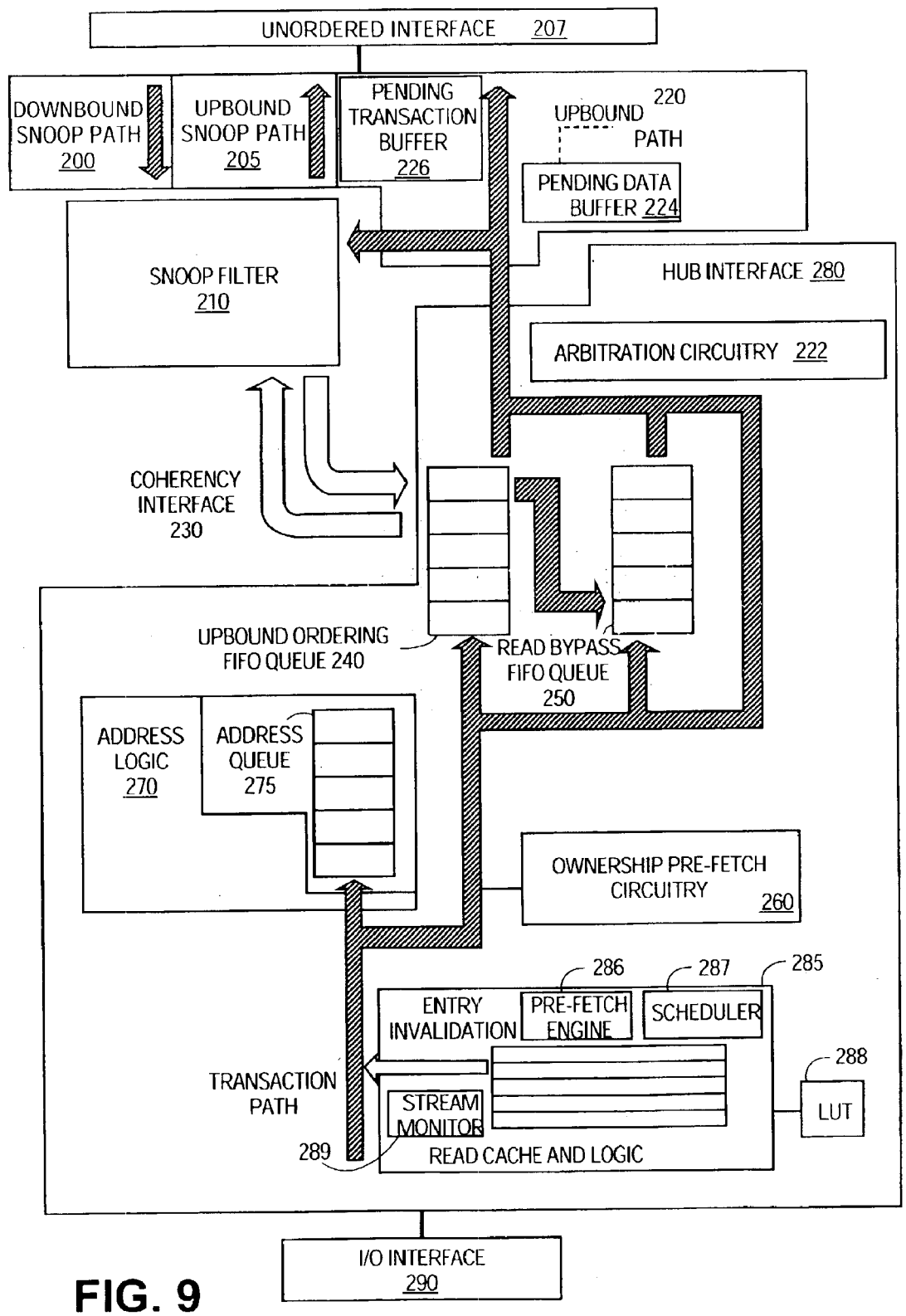
FIG. 9 depicts an embodiment of an apparatus such as an I/O Hub for a scalable system.

Referring now to FIG. 9, there is shown an embodiment of an apparatus of an I/O hub to maintain ordering for transactions between an ordered domain, I/O interface 290 and unordered domain, unordered interface 207. The embodiment may comprise unordered interface 207, downbound snoop path 200, upbound snoop path 205, snoop filter 210, coherency interface 230, hub interface 280, and upbound path 220. The downbound snoop path 200 may comprise circuitry to transmit a snoop request from the unordered interface 207 down to snoop filter 210. The upbound snoop path 205 may provide a path between snoop filter 210 and a controller on the other side of the unordered interface 207 to facilitate a snoop requests by snoop filter 210 and/or I/O devices coupled with I/O interface 290. In some embodiments, upbound snoop path 205 may facilitate cache coherency requests. For example, a processor in the unordered domain may comprise cache, and snoop filter 210 may request invalidation of a cache line after hub interface 280 receives a write transaction for memory associated with that cache line.

Snoop filter 210 may comprise conflict circuitry and a buffer. Conflict circuitry may determine conflicts between downbound snoop requests, inbound read transactions, inbound write transactions, and upbound transactions. Further, conflict circuitry may couple with the buffer to store the coherency states and associate the coherency states with entries in the upbound ordering first-in, first-out (FIFO) queue 240.

Coherency interface 230 may relay internal coherency completion and invalidation requests from snoop filter 210 to hub interface 280. These coherency requests may be generated by snoop filter 210 and may be the result of an ownership completion, a downbound snoop request, or an inbound coherent transaction. For example, after snoop filter 210 receives an ownership completion across unordered interface 207, snoop filter 210 may forward the completion across coherency interface 230 to the hub interface 280. The ownership completion may be addressed to the entry in the upbound ordering FIFO queue 240 that has a write transaction header associated with the corresponding ownership request.

Hub interface 280 may receive inbound transactions, such as upbound write and read transactions, and maintain ordering of the upbound transactions in accordance with ordering rules, such as PCI ordering rules and rules associated with coherency and the PCI producer consumer model. Hub interface 280 may comprise arbitration circuitry 222, transaction queues such as upbound ordering FIFO queue 240 and read bypass FIFO queue 250, ownership pre-fetch circuitry 260, address logic 270, address queue 275, read cache and logic 285, and I/O interface 290. Arbitration circuitry 222 may arbitrate access to the upbound path 220 between transaction queues, upbound ordering FIFO queue 240 and read bypass FIFO queue 250. In some embodiments, arbitration circuitry 222 may also arbitrate access between the transaction queues and ownership pre-fetch circuitry 260 to facilitate routing of coherency requests and responses from ownership pre-fetch circuitry 260 to snoop filter 210. For example, arbitration circuitry 222 may arbitrate substantially equivalent access between upbound ordering FIFO queue 240 and read bypass FIFO queue 250 for transmission of transactions from a transaction queue upbound through the upbound path 220 to unordered interface 207.

Hub interface 280 may comprise one or more transaction queues such as upbound ordering FIFO queue 240 to maintain a transaction order for upbound transactions according to the ordering rules and to store the coherency state and source ID for each upbound transaction. The source ID may associate an agent, or I/O device, with a transaction. Further, upbound ordering FIFO queue 240 may maintain an ordering for transactions received from the same source agent, or same source ID and/or hub ID. For example, upbound ordering FIFO queue 240 may receive transactions from agent number one and transactions from agent number two. The transaction order(s) maintained for agent number one and agent number two may be independent unless the transactions are associated with the same memory line. As a result, transactions from agent number one may satisfy their corresponding ordering rules and be transmitted to the unordered interface 207 without regard to transactions from agent number two, while transactions from agent number two may remain in upbound ordering FIFO queue 240. In some embodiments, an upbound ordering FIFO queue, such as upbound ordering FIFO queue 240, may be dedicated for a particular hub ID or source ID.

Read bypass FIFO queue 250 may facilitate progress of read transactions, wherein a read transaction may be subject to ordering rules independent of or substantially independent of ordering rules associated with transactions in upbound ordering FIFO queue 240. Read bypass FIFO queue 250 may receive read transactions from both the I/O interface 290 and the upbound ordering FIFO queue 240. For instance, I/O interface 290 may receive a first read transaction that may be associated with an address that may not have a matching entry in address queue 275. As a result, the read transaction may be forwarded to the bottom of the read bypass FIFO queue 250. In alternate embodiments, hub interface 280 may comprise more than one read bypass FIFO queue to adjust access to upbound path 220 between targets of transactions or transactions from different sources.

An advantage of embodiments that may comprise transaction bypass circuitry, such as circuitry comprising read bypass FIFO queue 250, may be that transactions may be processed in less time than the nominal snoop latency of the system. For example, when a read transaction may bypass a write transaction for the same memory line(s), the latency of the read transaction may not be penalized by the latency of the write transaction. Further, in embodiments that comprise ownership pre-fetch circuitry, such as ownership pre-fetch circuitry 260, the latency of a write transaction may not be limited to the nominal snoop latency of the system so the latency of the write transaction may decrease to the latency for the embodiment to process to write transaction.

Ownership pre-fetch circuitry 260 may pre-fetch ownership of a memory line for a transaction received by I/O interface 290 to avoid some latency involved with requesting ownership of the memory after the transaction may satisfy its corresponding ordering rules. A determination of pre-fetch ownership may be based upon whether an ownership of the memory line may reside with a pending transaction in upbound ordering FIFO queue 240. For instance, I/O interface 290 may receive a write transaction to write data to memory line one. Address logic 270 may verify that no entry in the upbound ordering FIFO queue 240 may be associated with memory line one. In response, ownership pre-fetch circuitry 260 may request ownership of memory line one via snoop filter 210. After address logic 270 determines that an entry in the upbound ordering FIFO queue 240 is associated with memory line one, the write transaction may be placed into the bottom of upbound ordering FIFO queue 240 and ownership for memory line one by the write transaction may not be requested again until the write transaction satisfies associated ordering rules or, in some embodiments, after the write transaction reaches or nears the top of upbound ordering FIFO queue 240.

Address logic 270 may maintain address queue 275 comprising addresses associated with pending transactions in hub interface 280 and may compare an address of an upbound transaction against addresses in the queue to determine whether ownership may be pre-fetched for the upbound transaction. In embodiments wherein read cache and logic 285 piggy-backs or attaches cache line invalidation data to read transactions to make a cache line available for a new copy of a memory line, read transactions may comprise more than one address so address logic 270 may compare more than one address associated with a read transaction against addresses stored in a queue to determine whether the read transaction should be forwarded to the read bypass FIFO queue 250 or to the upbound ordering FIFO queue 240.

Further, address queue 275 may comprise memory, or a queue, to store an invalidation address of cache line invalidation data. Address logic 270 and address queue 275 may maintain a list of one or more invalidation addresses to prevent a read transaction to read a memory line(s) from bypassing a transaction with cache line invalidation data, wherein the cache line invalidation data is associated with the same memory line(s). Preventing a read transaction from bypassing the transaction with cache line invalidation data may enhance synchronization between snoop filter 210 and the cache of read cache and logic 285.

In many embodiments, hub interface 280 compares a read transaction to the list of invalidation addresses in address queue 275 before forwarding the read transaction to the snoop filter 210. In some embodiments, the read transaction may be held in a transaction queue, such as upbound ordering FIFO queue 240 or read bypass FIFO queue 250, until the cache line invalidation data reaches snoop filter 210. In several embodiments, the logic involved with checking invalidation addresses may be simplified by placing a read transaction with an address matching an address in a queue, such as a FIFO queue, of address queue 275 into the bottom of upbound ordering FIFO queue 240. The read transaction may be placed into the bottom of read bypass FIFO queue 250 when the address does not match an invalidation address in address queue 275 and/or be allowed to bypass upbound ordering FIFO queue 240 when read bypass FIFO queue 250 is empty and the address does not match an invalidation address. In alternative embodiments, the snoop filter 210 may compare the read transaction against the list of addresses associated with cache line invalidation data pending in the transaction queue(s) and prevent the read transaction from being completed until the corresponding cache line invalidation data reaches snoop filter 210.

Read cache and logic 285 may snoop or monitor transactions as received by I/O interface 290. In some embodiments, read cache and logic 285 comprised a queue to retrieve read transactions. Read cache and logic 285 may recognize a read transaction for a memory line and may determine when a copy of the memory line associated with the read transaction is stored in read cache and logic 285. In response to a determination that a read transaction is associated with a memory line that is not stored in read cache, read cache and logic 285 may attach a cache line invalidation, or cache line invalidation data, to the read transaction. The cache line invalidation may inform the snoop filter 210 of the invalidated cache line after the header for the read transaction is received by snoop filter 210 and snoop filter 210 may modify a corresponding entry in a buffer of the snoop filter 210 to maintain cache coherency. Read cache and logic 285 may attach additional cache line invalidations to further read transactions to make room for copies of memory lines near the memory line associated with the read transaction.

In some embodiments, read cache and logic 285 comprises a stream monitor 289 to determine stream activity; cache logic circuitry coupled with said stream monitor to determine a real and speculative pre-fetch cache line schedule based upon the stream activity and to generate pre-fetch requests; and cache coupled with said cache logic circuitry to store pre-fetched cache lines in response to the pre-fetch requests. In several embodiments read cache and logic 285 comprises a stream monitor 289 to determine stream activity; a scheduler 287 coupled with the stream monitor 289 to determine a real and speculative pre-fetch cache line schedule based upon the stream activity; a pre-fetch engine 286 coupled with said scheduler 287 to generate pre-fetch requests; and cache coupled with said scheduler 287 to allocate cache to store pre-fetched cache lines in response to the pre-fetch requests.

The prefetch engine 286 may be responsible for handling read requests and sending data to a peripheral I/O device such as a NIC card, storage controller or a PCI—PCI bridge via I/O interface 290. The goal of the prefetch engine 286 may be to enhance or optimize high streaming data and, as well as to handle simultaneous concurrent I/O streams of varying demanded bandwidth in some embodiments. DMA protocols, for example, may comprise an application wherein large chunks of memory may be accessed by the I/O device to complete an operation (e.g., SCSI RAID controller initiates a disk write which translate into PCI reads).

Scheduler 287 may generate prefetch requests through a dynamic lookup table (LUT) 288 based on the number of available, active, or perceived streams. In addition, scheduler 287 may have the ability to sense real time traffic with a real time traffic mechanism and may modify the pre-fetch request generation rate on a cache line granularity for different I/O modes (eg. PCI/PCI-x). In still further embodiments, scheduler 287 may comprise an inbuilt adaptive throttling mechanism to prevent or substantially prevent memory subsystem overload and yet may also provide a requested I/O bandwidth.

Hub interface 280 may implement an integrated caching and prefetch mechanism to provide streaming data to high performance applications which occur, for example, in web-servers, database processing, data mining & retrieval, network and file servers. The read cache of read cache and logic 285 may maintain coherency with the rest of the system and may eliminate the overheads to implement invalidation schemes which are less conducive to I/O streaming. Prefetching cache lines may hide round trip read latency and may save every read request from traversing through the entire chipset to memory and back. The spatial locality of read requests and contiguous address space (such as Memory Read Multiple in PCT Bus protocol) lend very well to pre-fetching cache lines. This may be important to server applications where a large amount of data may transfer at high bandwidth. For example, a SCSI RAID controller may initiate a 4 KB DMA transfer to perform disk write operation which translate into inbound reads.

Figure 10:
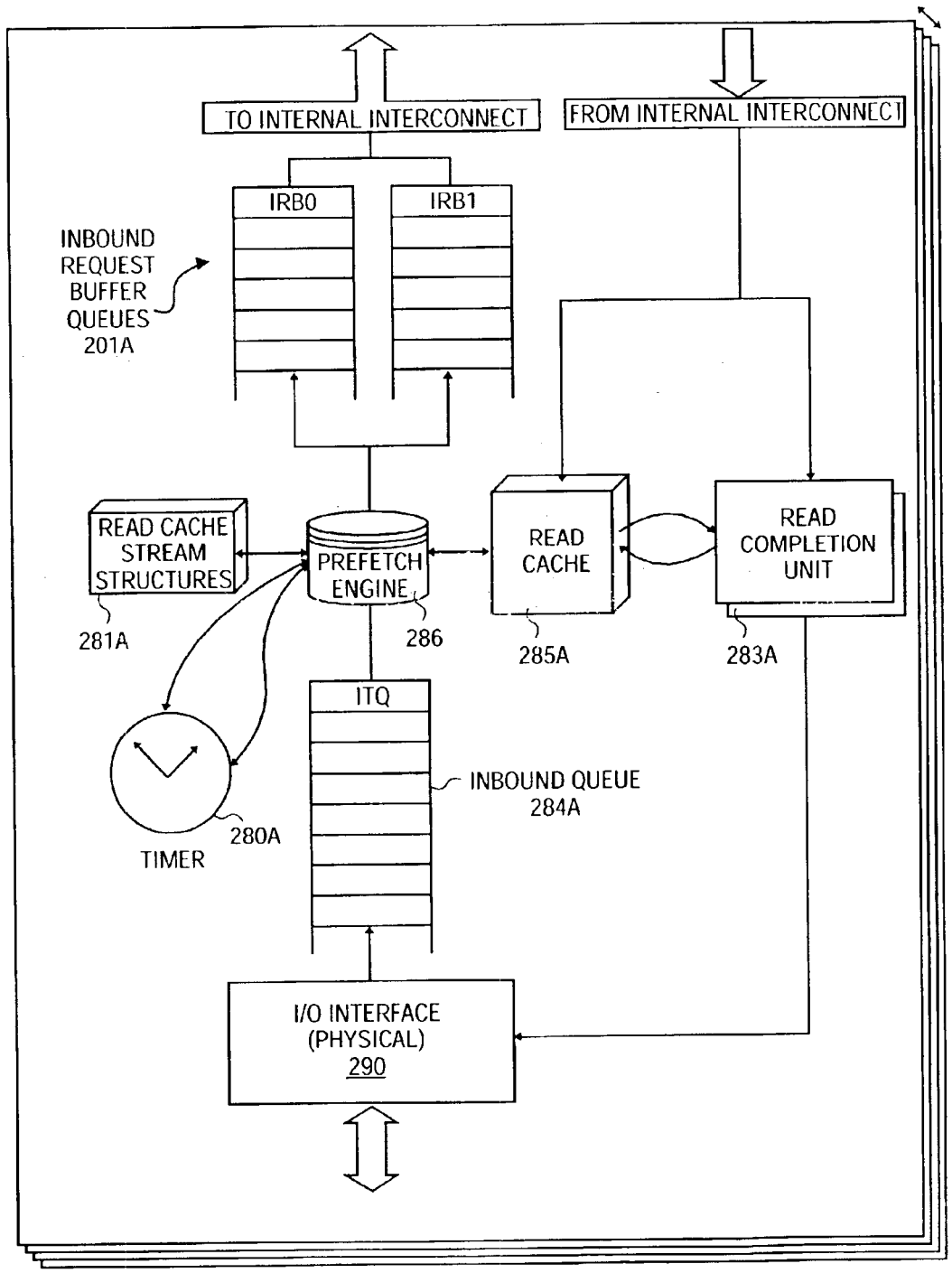
FIG. 10 depicts another embodiment of an apparatus such as an I/O Hub or a Hub Interface thereof for a scalable system.

Referring now to FIG. 10, there is shown a Hub Interface Cluster in Hub Interface 280. FIG. 10 illustrates the basic relationships of the prefetch engine 286, read cache 285A, inbound queue 284A and related components in one of the Hub interface clusters. For purposes of better scalability, and reducing unrelated traffic interaction between streams, the I/O Hub may implement distributed read caches, one per Hub interface, such as hub interface 280 although some embodiments may comprise a unified cache. A stream may comprise a sequence of requests, such as read or write requests, from an I/O bridge starting with an initial address and request length and further continued by requests with contiguous addresses in logical order. Note that requests from multiple streams may arrive at the I/O Hub or hub interface 280 in an interleaved fashion. Read requests issued through the I/O Interface 290 by an external I/O bridge may be serviced by the prefetch engine 286 via I/O interface 290. The inbound transaction queue (ITQ) 284A may accept transactions targeted for main memory and peer I/O bridges. The ITQ 284A may accept transactions originating from the I/O Interface 290 and may forward the transaction to the internal interconnect.

The Hub Interface cluster may break up coherent read requests into multiple cache line requests and may send them through the Inbound request buffer (IRB) queues 201A to the internal interconnect and through the Scalability Port to the memory subsystem. The Hub Id (encoded in the I/O Interface 290 request packet) may indicate which of the two IRBs to send the request to using the LSB (least significant bit, e.g. "0" or "1") to specify IRB0 or IRB1. Transactions may progress through the ITQ in FIFO order unless the ordering rules prevent its issuance.

For example, while the Hub Interface master may request a cache line aligned 256 bytes of data, the Hub Interface cluster may issue two 128-byte requests (e.g., four 64 byte reads) to the internal interconnect. For an unaligned request, the Hub Interface cluster may issue three 128-byte requests (e.g., six 64-byte reads). A read completion structure may be assigned for each cache line request that was requested from the I/O interface 290.

The read cache module for each I/O Interface 290 may comprise a fully associative memory of 4 KB that may store addresses and coherent information. This central read cache may be referenced by a number of read streams issued by I/O bridges for that I/O interface 290. A stream may initially be assigned based on the incoming request. After assignment, the Hub Interface cluster may send cache line read requests to the memory controller. After a read completion is returned on the I/O Interface 290 that completion structure may be available for further read requests. The Hub Interface cluster may not wait for enough completion structures for the entire subsequent request before issuing the next cache line read request. For example, when there is one completion structure available and the I/O Hub gets an inbound read request for 256 bytes, the corresponding hub interface 280 may issue the request for the first 128 bytes of the 256 byte request. The second 128 byte request may wait until another completion structure is available. After all the completion structures are pending completion, the ITQ 284A may buffer subsequent inbound read requests (writes may proceed independent of the completion structures' status). After all the ITQ 284A entries are full, the Hub Interface cluster may exert backward pressure and may issue retries to future inbound I/O Interface 290 requests until there is at least one slot may be available in the ITQ 284A.

After the read data has returned (perhaps multiple lines) from memory, they may be installed in the read cache 285A with coherence information, and the lines may be sequenced in the read completion unit 283A and may be sent to the I/O Interface 290. Status and book-keeping information for a stream may be stored in a "read_cache_stream" structure, which may comprise a record of the current requested address, length, time last accessed, etc. A timer 280A may be associated with each stream to indicate when the stream becomes active, inactive, and/or may be perceived as active or inactive. If no subsequent requests are received for that stream before the timer expires, then the stream may be inactive or perceived as inactive. To provide for long read bursts, pre-fetching cache may be initiated after the initial real request is sent inbound. (e.g. I/O bridge may send a read request for 256B starting at Address x). Subsequent read requests from the I/O Interface 290 that hit the cache for the given stream may be sent to the I/O Interface 290 directly from the cache without incurring upstream latency. A pre-fetch cache depth for sustaining the pipeline may be calculated as a function of the round trip delay for the read data and the time to transfer the data across the I/O Interface 290 (e.g., to tolerate a memory latency of 960 ns from the I/O Hub and burst at 1066 MB/s on the I/O interface 290, approximately 960*1.066=1024 bytes or eight 128B cache lines may be "in flight").

The read cache prefetch engine 286 may dynamically allocate buffer space in the read cache 285A based on incoming streams and may provide a seamless cache line replacement method for continuous streaming and buffer re-use; generate prefetch requests on a cache line granularity through a dynamic lookup table (LUT) 288 based on the number of available concurrent I/O streams; sense real time traffic and modify a pre-fetch cache request generation rate for different I/O modes (e.g. PCI/PCI-X); and throttle upstream requests to prevent memory subsystem overload.

Prefetch modes such as the modes shown in FIG. 11A, may be based upon the type of bus or agent that has an active stream. An incoming read stream from the I/O Interface 290 may be considered as having two phases: Real Request Phase and Speculative Request Phase. In the real request phase, a read request of fixed length may be made by the I/O interface and the I/O Hub may attempt to deliver the requested data as quickly as possible. The data may hit the read cache or it might miss the read cache, resulting in a fetch from main memory. When a stream enters the real request phase, it may be considered a higher priority than streams in the Speculative Request phase. The stream may enter the Speculative Request Phase, after all requested data has been fetched by the I/O Hub. At this point, the stream may follow an adaptive prefetch mechanism. The assumption may be that if the master requested data at address X, then the master may subsequently request data at address X+1. Pre-fetching may continue as long as the stream is still allocated, e.g. active or perceived active, and, in some embodiments, the throttle limit has not been reached. Based on the number of active streams, the Hub Interface cluster may attempt to prefetch n number of lines ahead of the Real request. Pre-fetching may be disabled when excessive read streams are generated at I/O Interface 290. Speculative requests may be issued, for example, after the real request is greater than 128 bytes.

The adaptive prefetch mechanism may use a dynamic LUT to prefetch cache lines in the speculative phase. Two prefetch profiles (conservative and aggressive) may be used to index the appropriate look-up table values as shown in FIG. 11B. Profile selection may be a function of the number of PCI/PCI-x buses attached to the I/O bridge and the nature of devices (e.g. PCI vs. PCI-x). At a given point in time, the pre-fetch engine might be utilizing the conservative profile. As soon as any of the "aggressive" conditions are detected the Hub Interface 280 may change the pre-fetching to adapt to the change in bandwidth requirements. Likewise, after an aggressive condition no longer exists, the pre-fetch engine may switch back to the "conservative" pre-fetch profile.

Once a prefetch profile is chosen, the number of active streams may determine the appropriate LUT entry and control the number of lines to prefetch ahead of the real request for that stream as shown in FIG. 11B. For instance, if only 1 stream exists and the prefetch profile is set to "aggressive", then up to 8 cache lines may be pre-fetched. If the number of streams increases to 2, then each stream may be limited to a maximum of 4 cache lines. Thus the degree of pre-fetching may vary with the number of available streams. By having the ability to detect when a stream becomes active or inactive through the timer mechanism, such as timer 280A in FIG. 10, the number of streams may be automatically computed in real time and pre-fetching may be dynamically controlled. This adaptive self-regulation may comprise a trade-off between pre-fetching enough data for the Hub Interface master and not overshooting the memory, thereby impacting the rest of the system. As a further governor, the I/O Hub may maintain an upper limit of eight cache lines that may be pending delivery to a particular Hub Interface 280 and may minimize the memory overshoot.

In many embodiments, the number of cache lines "in flight" or "pending" may be calculated on a 128-byte quantity. For example, the I/O Hub may issue a pair of 64-byte requests for a real request. This pair may be considered as one line "in flight" for purposes of the prefetch algorithm. For example, after a real request is issued to the Hub Interface, cluster and it misses the read cache 285A, the number of real requests "in flight" may be compared against 8. The term "in flight" may refer to reads that have been issued to the Scalability Port but have not yet returned to the Hub Interface cluster (read cache 285A). For instance, if there are already eight lines in flight, then the read request may not issue until at least one line returns to the Hub Interface cluster. In many of these embodiments, a new request may not be issued until another completion structure is available. On the other hand, if the number of lines "in flight" is less than the maximum allowable, then the real request may be issued.

In several embodiments, the mechanism for issuing speculative requests may determine the Prefetch profile using the table in FIG. 11B, or the like. Before any speculative requests may issue to the Scalability Port (after a read cache miss), the sum of real requests "in flight" and speculative requests "in flight" may be compared against the maximum cache lines in flight (8). The term "in flight" may refer to reads that have been issued to the Scalability Port but have not yet returned to the Hub Interface cluster (read cache 285A). For example, if there are already eight lines in flight, then the speculative read request may not issue until at least one line returns to the Hub Interface cluster. If the number of lines "in flight" is less than the maximum allowable, then prefetch parameters may be determined from the table in FIG. 11B. The number of active streams or streams perceived as active and the prefetch profile may determine the upper limit of speculative requests for a particular stream. For example, if only one stream is active and the profile is Aggressive, then the Hub Interface cluster may check if the total number of "pending" cache lines is less than 8. The term "pending" may refer to lines that have been issued for a read stream (real or speculative) but have not yet been delivered to the Hub Interface agent. If so, the Hub Interface cluster may issue up to 8 speculative read requests (the Aggressive profile may not allow more than 8 total requests in flight). If not, a speculative read is not issued until the pending lines drops below the value noted in the table (8 for this example).

The Hub Interface cluster may enforce speculative prefetching for streams which may have a zero Prefetch Horizon field in the initial real request and, in many embodiments, wherein the initial request may be greater than, e.g. 128 bytes (regardless of cache line size). The number of cache lines pending may be incremented after a line read is issued by the I/O Interface 290 and may be decremented after they return to the I/O Interface. In other embodiments, the number may be incremented after a pair of lines is issued and may be decremented after one or both lines return. Read cache hits may not affect the number of cache lines pending. In several such embodiments, the IOH may prioritize real requests and may maintain pre-fetching up to a high or maximum limit.

Referring back to FIG. 9, hub interface 280 may comprise a unified cache, the read cache of read cache and logic 285, for streams via I/O interface 290. The unified cache may comprise a stream monitor to determine stream activity; cache logic circuitry coupled with said stream monitor to determine a cache structure to allocate to streams based upon the stream activity; and cache coupled with said cache logic circuitry to store pre-fetched cache lines in the cache structure for the streams. In several embodiments, the unified cache may comprise a stream monitor to determine a change in a number of active streams; a scheduler coupled with said stream monitor to determine pre-fetch schedule based upon the number of active streams; and cache coupled with said scheduler to allocate cache to active streams based upon the pre-fetch schedule. In further embodiments, the unified cache may comprise a unified cache for more than one hub interface like hub interface 280.

The unified cache may also be implemented in other cache applications, such as other applications wherein data may be pre-fetched like an I/O bridge, network cards and storage controllers or to other I/O bridges that connect to the peripheral I/O devices, and connect on their other end to a system interconnection network/north bridge/memory controller that connects to the system memory and processors. In many applications, the unified cache may be logically unified but physically separate.

The I/O hubs/bridges may use read caches or buffers for staging data between the system memory and the peripheral I/O devices or I/O bridges when such devices read from the memory. More often than not, the I/O devices read huge chunks of contiguous data from the memory via DMA operations, for example paging out data to disk from memory. This traffic pattern lends itself very well to prefetching. Therefore, the I/O hubs/bridges typically also have pre-fetch engines like pre-fetch engine 286, that are responsible for handling the read requests from the peripheral I/O devices or I/O bridges and pre-fetching ahead of these requests (using the read caches or buffers for storing/staging the data) from the system memory to provide high streaming bandwidth.

The number of read streams may vary dynamically as an application executes. A high performance I/O hub/bridge may provide high streaming bandwidth both when there is a single read stream as well as when there are many concurrent read streams. Embodiments may comprise a die space efficient unified read cache or buffer architecture in the I/O hub/bridge across more than one stream from an I/O bus with adaptive pre-fetch scheduling via scheduler 287.

Embodiments of the unified cache may comprise adaptive pre-fetch scheduling to use a unified common read cache/buffer of size XYZ-KB across more than one stream; restrict the maximum total cache/buffer usage across the more than one stream to the unified cache/buffer size of XYZ-KB wherein XYZ may be larger (e.g. 2×) than the amount of useful pre-fetch data for continuous streaming to smoothly transition between different numbers of streams; track the number of active streams, N; the total cache/buffer space being used currently, TOTUSE; and the cache/buffer space in use by each stream j, USE_j; adapt the pre-fetch scheduling using XYZ, N, TOTUSE, USE_j by adaptively restricting or substantially restricting the maximum cache/buffer usage per stream such as by using a look-up table that uses N to look up a pre-set table to determine the maximum allowed cache/buffer usage per stream for that N or by using a formula that is computed for a given N etc; and allocating the same cache/buffer space to different streams using a replacement mechanism such as LRU, LRA etc.

Figure 12:
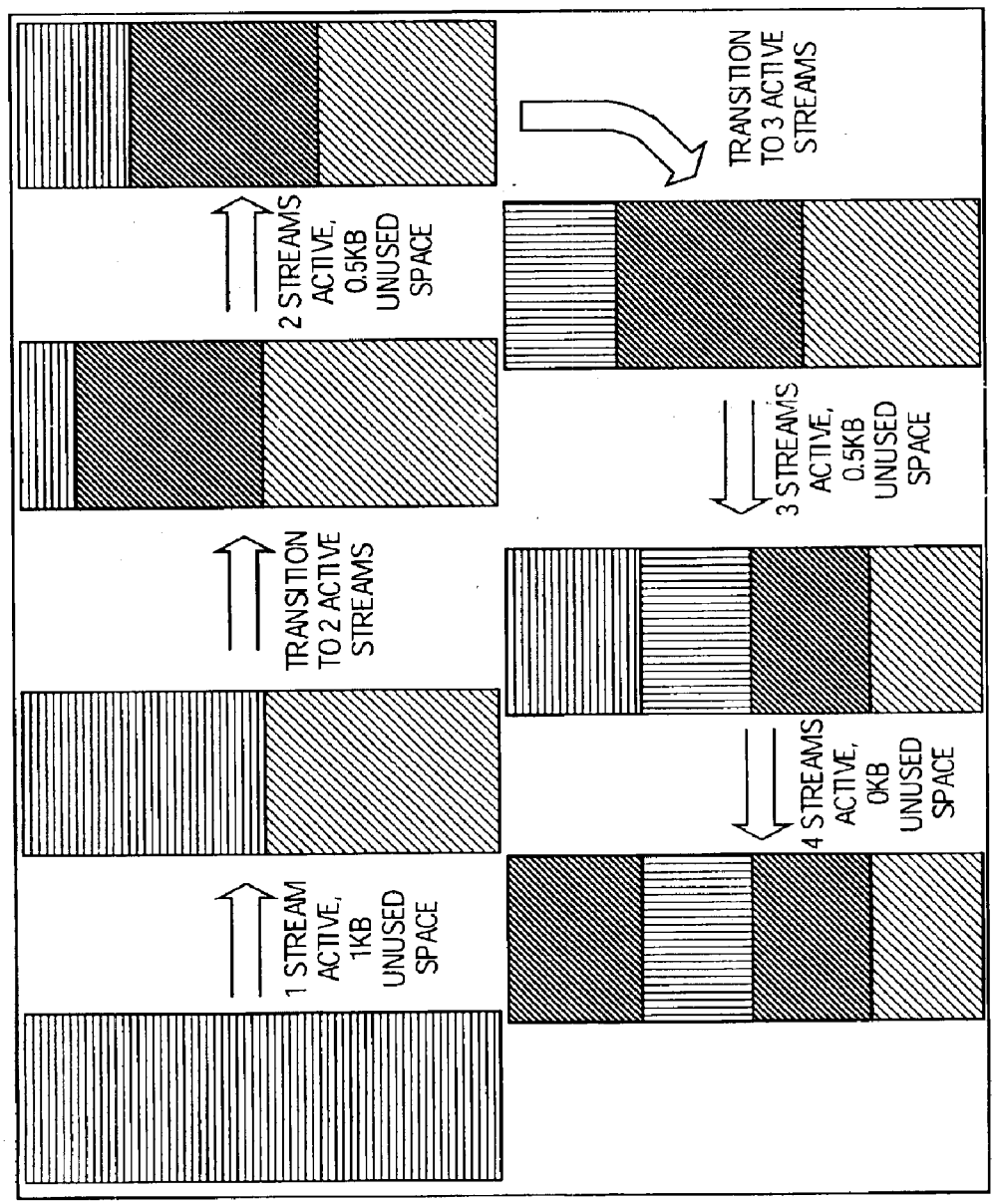
FIG. 12 depicts an example operation of an embodiment comprising unified cache.

FIG. 12 illustrates an embodiment for a 4 active streams scenario wherein there may be 0.5 KB per stream and no unused space, the total space being 2 KB. The same example may apply to eight streams with 0.25 KB per stream and no unused space.

In the embodiment shown in FIG. 12, a first stream may become active, using 1 KB of cache and leaving 1 KB for a subsequent active stream. After each subsequently active stream, an adaptive mechanism may adjust the cache available to each stream to leave 0.5 KB available for a subsequent stream until four streams use 0.5 KB of cache each. This example, may illustrate, for example, a single bus or I/O interface that may limit streams to 2 KB.

The actual implementation details may differ depending on many conditions such as whether the I/O hub/bridge is directly connected to the peripheral devices or to other bridges which may require different ways of tracking the number of active streams, the schedule/cost/complexity/application trade-offs for a particular chip that may result in choosing different replacement algorithms for the cache/buffer, or different throttling mechanism (fine or coarse grained throttling with number of streams) etc. Implementation detail aside, the unified read cache/buffer architecture with adaptive pre-fetch scheduling may provide high streaming bandwidth performance in I/O hubs/bridges by efficiently using smaller die space. For example, an embodiment may comprise the I/O Hub chip of the chipset which may use a look-up table adaptive scheduling mechanism with timer based active/in-active stream detection and LRA cache replacement algorithm using a fully associative read cache per Hublink bus.

Referring back to FIG. 9, in many embodiments, a stream timing system may be implemented by scheduler 287 to improve the determination or the timing of a determination of active and/or inactive streams. The stream timing system may comprise a timing mechanism to determine an occurrence of a event and comprising a reset mechanism to change the event; cache logic circuitry coupled with said timing mechanism to change allocation of a cache structure for a stream based upon the occurrence of the event; and cache coupled with said cache logic circuitry to store data in the cache structure. In several embodiments, the stream timing system may comprise an event that is heuristically determined.

The stream timing system may provide an ability to enhance cache allocation for streams by detecting when a stream may becomes active or inactive so the number of streams may be automatically computed in real time and pre-fetching may be dynamically controlled. For example, after a prefetch profile is chosen, the number of active streams may determine the appropriate LUT 288 entry and control the number of lines to prefetch. If only one stream exists and the mode is aggressive, then up to 8 cache lines, for instance, may be pre-fetched. If the number of streams increases to 2, then a stream may be limited to 4 cache lines. When there may be many streams active, the cost of excess pre-fetching may be high since the memory subsystem may be overloaded with requests that may be wasted and increasing the startup latency of the peripherals.

One embodiment of a timing mechanism may comprise an inactivity timer. The I/O Hub may implement, for example, a 10-bit inactivity timer for each of the active streams involved with speculative pre-fetching. The timer may facilitate de-allocation of a stream after the stream becomes inactive. An embodiment of a timing mechanism that may maintain cache allocation for inactive streams may suppress pre-fetching for requests from other useful streams since the LUT is a function of the number of perceived streams in the IOH and will use a less than ideal value. Conversely, a timing mechanism that may de-allocate an active stream may result in early stream destruction and increase memory overshoot through excess prefetch. Hence, some embodiments that implement timers may heuristically chose time periods to determine when a stream may be inactive or may still be active.

In one embodiment, each 10-bit timer runs at 200 MHz providing a programmable value of 1.28 microseconds to 5.12 microseconds. The timer may begin counting after the data requested by the Hub Interface master is delivered on the I/O Interface 290. Whenever a new request "hits" an allocated stream, the timer may be cleared. After the timer reaches a value, such as values described in FIG. 13 or programmed in the I/O Hub register, the stream may be deemed to have expired and may be de-allocated from the stream structure. FIG. 13 shows an example of how the inactivity may be programmed for each Hub Interface depending on, for instance, the corresponding PCI subsystem based on performance analysis.

Referring back to FIG. 9, in some embodiments hub interface 280 may also provide circuitry to determine a coherency state for an inbound transaction and respond to coherency requests issued across coherency interface 230 from snoop filter 210. For example, when snoop filter 210 sends an ownership completion, hub interface 280 may accept the completion and update the status of the targeted inbound transaction as owning the memory line, or change the coherency state of the targeted inbound transaction from a pending state to 'exclusive'. On the other hand, when snoop filter 210 sends an invalidation request targeting an inbound write transaction that has a coherency state of pending, (e.g., may not own the memory line), hub interface 280 may accept the invalidation and reissue a request for ownership after the inbound write transaction may reach or near the top of upbound ordering FIFO queue 240.

After a transaction reaches the top of a transaction queue, such as upbound ordering FIFO queue 240 or read bypass FIFO queue 250, arbitration circuitry 222 may grant access to a transaction queue and the corresponding transaction may transmit to upbound path 220. Upbound path 220 may comprise pending data buffer 224 and pending transaction buffer 226. Pending data buffer 224 may receive and store data associated with upbound transaction awaiting transmission across unordered interface 207. Pending transaction buffer 226 may store a transaction header for a transaction pending on the unordered interface 207. For example, when I/O interface 290 receives an upbound transaction, hub interface 280 may place the header of the transaction in upbound ordering FIFO queue 240 and transmit the data associated with the header to pending data buffer 224. At some point after satisfying ordering rules, the header may be forwarded to the pending transaction buffer 226 to await transmission across unordered interface 207. Then, the data may transmit across unordered interface 207.

In some embodiments, pending data buffer 224 may comprise a separate buffer for one or more I/O devices coupled with I/O interface 290 based upon one or more hub ID's. In other embodiments, pending data buffer 224 may comprise mechanisms such as pointers to associate a section of a buffer with a hub ID.

In many embodiments, hub interface 280 may also comprise starvation circuitry to prevent starvation of a transaction, or leaf of transactions, as a result of ownership stealing. For example, starvation circuitry may monitor the number of invalidations transmitted to and/or accepted by hub interface 280 for a transaction, or a leaf of transactions, and once a count of invalidations reaches a starvation number, the starvation circuitry may stall the I/O interface 290 to flush the upbound ordering FIFO queue 240 and/or read bypass FIFO queue 250. The starvation number may be based upon statistical and/or heuristic data and/or a formula derived there from. Thus, the transactions associated with upbound ordering FIFO queue 240 and/or read bypass FIFO queue 250 may clear before additional write and/or read transactions may be received via I/O interface 290. In some embodiments, starvation circuitry may couple with arbitration circuitry 222 to modify the level of access arbitrated to upbound ordering FIFO queue 240 and/or read bypass FIFO queue 250.

Figure 14:
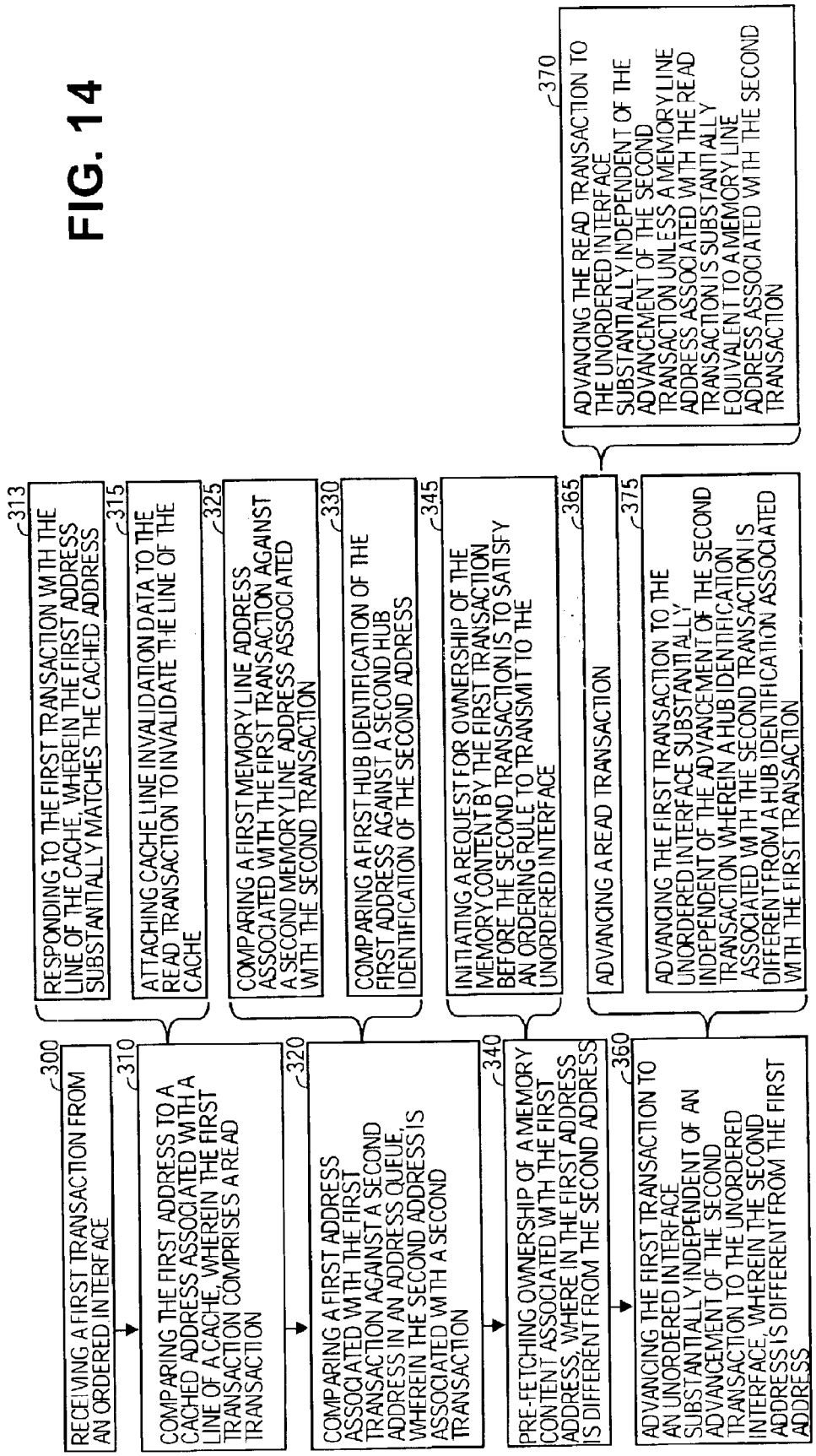
FIG. 14 depicts a flow chart of an embodiment of a scalable system.

Referring now to FIG. 14, there is shown a flow chart of an embodiment to maintain ordering for transactions and to transact between an ordered interface and an unordered interface. The embodiment may comprise receiving a first transaction from an ordered interface 300; comparing the first address to a cached address associated with a line of a cache, wherein the first transaction comprises a read transaction 310; comparing a first address associated with the first transaction against a second address in an address queue, wherein the second address is associated with a second transaction 320; pre-fetching ownership of a memory content associated with the first address, wherein the first address is different from the second address 340; and advancing the first transaction to the unordered interface substantially independent of an advancement of the second transaction to the unordered interface, wherein the second address is different from the first address 360. Receiving a first transaction from an ordered interface 300 may comprise receiving a transaction from an I/O device coupled with the ordered interface in a transaction order according to ordering rules associated with the I/O interface or an I/O device coupled with the I/O interface. In many embodiments, the transactions may be received from more than one I/O device and, in several embodiments, the transactions received may comprise transactions subject to independent ordering rules.

Some embodiments may comprise comparing the first address to a cached address associated with a line of a cache, wherein the first transaction comprises a read transaction 310. Comparing the first address 310 may compare a first memory line address against memory line addresses in the cache to determine whether a valid copy of the memory line may be stored in a line of the cache. Comparing the first address 310 may comprise responding to the first transaction with the line of the cache, wherein the first address substantially matches the cached address 313 and attaching cache line invalidation data to the read transaction to invalidate the line in the cache 315. Responding to the first transaction with the line of the cache, wherein the first address substantially matches the cached address 313 may comprise retrieving a line of the cache from a cache to store data for a leaf and/or a hub ID. In other embodiments, the cache may comprise one or more memory arrays that dedicate an amount or physical division of the cache to store data for a leaf or hub ID. These embodiments may comprise populating. the cache with data of a memory line anticipated to be the target of a subsequent read transaction. In many embodiments, a cache pre-fetch algorithm may anticipate a memory line as the target of a subsequent read transaction based upon a read and/or write transaction from an I/O device or leaf. Responding to the first transaction 313 may transmit a response or completion to the requester, or I/O device, without forwarding the read transaction to the unordered interface. In several of these embodiments, such a cache hit may reduce the latency of the read transaction, as well as transactions that may not compete with the read transaction for access to the unordered interface after the hit.

Attaching cache line invalidation data to the read transaction to invalidate the line in the cache 315 may, after a cache miss, attach data to cause the snoop filter to invalidate a line of the cache to make room for an additional entry in the cache. In some embodiments, the invalidation may be attached to or incorporated into a read transaction that may read a memory line to store in the cache and, in some embodiments, the memory line may be stored in the cache line associated with the invalidation. In one embodiment, the cache line invalidation data may be inserted into the header of the read transaction. In several embodiments, the cache line invalidation may be subject to an ordering rule that does not allow the cache line invalidation data to pass a transaction associated with the same memory line, e.g. the ordering of the invalidation is dependent upon the transaction order of another pending transaction. So the advancement of the read transaction toward the unordered interface may be restricted or limited by the ordering rule for the attached cache line invalidation. For example, the ordered interface may receive a read transaction and a comparison of the memory line associated with the read transaction may result in a cache miss. As a result, read cache logic may decide to store the memory contents of the memory line associated with the read transaction into the cache and piggy-back cache line invalidation data in the header of that read transaction. Address logic may determine the memory line subject to the read transaction may have a different address than addresses stored in the address queue, however, the address associated with the cache line invalidation data, or the invalidation address, may match an entry in the address queue. As a result, the read transaction may be placed at the bottom of an upbound ordering queue. Once the read transaction may reach the top of the upbound ordering queue, the read transaction may be eligible to transmit across the unordered interface, or may have satisfied the ordering rule corresponding to the cache line invalidation. In other situations, the read transaction may have to satisfy both an ordering rule associated with the invalidation address and the address of the memory line before becoming eligible to transmit upbound, advancing toward the unordered interface. After the snoop filter receives the cache line invalidation data, the snoop filter may invalidate an entry in the read cache to store the data resulting from the read transaction. After the completion for the read transaction is received, the data of the read completion may be written in the read cache at the entry associated with the cache line invalidation data.

Many embodiments may maintain a transaction order for an upbound transaction based upon an ordering of an I/O interface to transmit the upbound transaction to an unordered interface by placing the upbound transaction in an ordering queue. For example, a first write transaction received from an I/O interface may be placed in an upbound ordering queue. Then a second write transaction may be placed in the upbound order queue. After the first transaction may reach the top of the ordering queue, the first write transaction may issue to the unordered interface. In some embodiments, after receiving a completion for the first write transaction, the second write transaction may advance toward the unordered interface. In other embodiments, after the first write transaction may issue to the unordered interface, the second write transaction may advance upbound.

Many embodiments may maintain a transaction order to prevent problems associated with performing transactions out of order. For example, an agent on the ordered interface, such as an I/O device coupled with a bridge, may issue a series of four write transactions and, assuming that the transactions will be performed in order, issue a fourth write transaction that may modify the same memory contents that the first write transaction modifies. When these transactions may be performed in an order other than the order of issuance, the changes to the memory contents may be unpredictable.

Comparing a first address associated with the first transaction against a second address in an address queue, wherein the second address is associated with a second transaction 320 may determine whether a second transaction may perform an action upon the same memory line as the first transaction, whether the first and the second transaction may be issued from the same I/O device, or whether an invalidation address attached to the first transaction may match an address in the address queue. For instance, a write transaction and a read transaction may have been received prior to receiving the first transaction and the memory line addresses associated with the write and read transactions may be stored in an address queue. After the first transaction is received, the address logic circuitry may compare the memory line address associated with the first transaction against the memory line addresses associated with the read and write transactions to determine that one, both, or neither of the transactions may perform an action on the same memory line. In response to a determination that one of or both the read and write transaction may perform an action on the same address, the address logic may transmit a signal to the ownership pre-fetch circuitry. In many of these embodiments, a signal may be transmitted to the ownership pre-fetch circuitry to stop, request, and/or initiate, pre-fetching ownership for the first transaction.

Comparing a first address associated with the first transaction against a second address in an address queue, wherein the second address is associated with a second transaction 320 may comprise comparing a first memory line address associated with the first transaction against a second memory line address associated with the second transaction 325 and comparing a first hub identification of the first address against a second hub identification of the second address 330. Comparing a first memory line address 325 may compare the address of the memory line that the first transaction may perform a read of or write to against the address of the memory line address that the second transaction may perform a read of or write to, to determine whether the first transaction and the second transaction may perform action on the same memory line and, in many embodiments, whether the transactions may perform actions on the same memory contents of the memory line. For example, when the first transaction is a write and the second transaction is a write transaction, comparing a first memory line address 325 may determine that the first transaction may write to the same memory cells as the second transaction. In other situations, comparing a first memory line address 325 may determine that a read may be performed on the same memory cells as a write. In many embodiments, comparing a first memory line address 325 may further determine whether the first transaction may advance toward the unordered interface, or upbound, independent of an advancement of the second transaction upbound by comparing an invalidation address associated with the first transaction against a list of invalidations addresses in an address queue.

Comparing a first hub identification of the first address against a second hub identification of the second address 330 may determine whether the first transaction and the second transaction are transactions from the same I/O device, such as an Ethernet card. For example, two I/O devices may be coupled to a bridge and the bridge may be coupled with an I/O interface to allow the two input output devices to transact across an unordered domain. The first I/O device may be associated with a hub ID of zero and the second I/O device may be associated with a hub ID of one. When the buses interconnecting the two I/O devices to the I/O interface is a peripheral component interconnect bus and operate according to PCI ordering rules, the transactions associated with the first I/O device (hub ID zero) may be independent of transactions associated with the second I/O device (hub ID one) with respect to ordering rules. Some embodiments take advantage of the independence by comparing a first hub identification of the first address against a second hub identification of the second address 330. Other embodiments may not track the hub ID associated with a transaction.

Referring still to FIG. 14, pre-fetching ownership of a memory content associated with the first address, wherein the first address is different from the second address 340, may initiate a request for ownership of an address prior to the first transaction satisfying ordering rules associated with that first transaction. Pre-fetching ownership 340 may pre-fetch ownership of the memory content for a transaction so that the transaction may be ready to transmit across an unordered domain as soon as the transaction satisfies its ordering requirements.

Pre-fetching ownership 340 may comprise initiating a request for ownership of the memory content by the first transaction before the second transaction is to satisfy an ordering rule to transmit to the unordered interface 345.

Initiating a request for ownership 345 may steal an ownership from the second transaction, or take ownership of the same memory line as the second transaction, wherein the transaction order of the first transaction is independent of the ordering rules associated with the second transaction. After the ownership of the same memory line is taken by the first transaction, or stolen, the snoop filter may invalidate the ownership of the memory line by the second transaction. In other situations, the second transaction may not have an ownership of the memory line so the first transaction may gain ownership of the memory line before the second transaction may receive ownership. In many of these cases, the first transaction and the second transaction may race to satisfy ordering rules and after the second transaction may satisfy its ordering rules first, the second transaction may steal the ownership from the first transaction. In other situations, after the first transaction may transmit across the unordered domain and/or a completion may be received for the first transaction, the second transaction may request and receive ownership for the memory line.

In some embodiments, initiating a request for ownership of the memory content by the first transaction 345 may pre-fetch ownership for the first transaction after a determination that the ordering requirements of, or ordering rules for, the first transaction maybe independent of the ordering rules for the second transaction. In many embodiments, determining the ordering rules may be independent may comprise determining that the first address and the second address are different, such as a different target address or a different source address. The difference target address may comprise a different memory line and the different source address may comprise a different hub ID. The hub ID may be a part of a number that identifies the source I/O device.

Many embodiments may comprise advancing the first transaction to an unordered interface substantially independent of an advancement of the second transaction to the unordered interface, wherein the second address is different from the first address 360 may allow a read or write transaction to bypass the upbound ordering queue wherein the memory line associated with the read or write transaction, invalidation address, and/or the hub ID associated with the read or write transaction may differ from memory lines, invalidation addresses, and/or hub ID's stored in the address queue.

Advancing the first transaction to an unordered interface substantially independent of an advancement of the second transaction to the unordered interface, wherein the second address is different from the first address 360 may comprise advancing a read transaction 365 and advancing the first transaction to the unordered interface substantially independent of the advancement of the second transaction, wherein a hub identification associated with the second transaction is different from a hub identification associated with the first transaction 375. Advancing a read transaction 365 may place the read transaction in a read bypass queue when the read transaction was initiated by a source device associated with a hub ID that is different from hub ID's associated with transactions in an upbound ordering queue. For instance, a read transaction having a hub ID of zero may be placed in the read bypass queue wherein transactions in the upbound ordering queue associated with hub ID zero have no entries associated with hub ID zero.

Advancing a read transaction 365 may comprise advancing the read transaction to the unordered interface substantially independent of the advancement of the second transaction unless a memory line address associated with the read transaction is substantially equivalent to a memory line address associated with the second transaction 370. Advancing the read transaction 370 may forward the read transaction to a read bypass queue when the memory line to be read is different from the memory lines stored in the address queue or memory lines of transactions awaiting transmission across the unordered interface. In embodiments where the address queue may also store hub ID's associated with pending transactions, advancing the read transaction 370 may also forward the read transaction to the read bypass queue when the hub ID associated with the read transaction is different from the hub ID's in the address queue.

Advancing the first transaction to the unordered interface substantially independent of the advancement of the second transaction, wherein a hub identification associated with the second transaction is different from a hub identification associated with the first transaction 375 may allow a write and/or read transaction to bypass another write or read transaction in an upbound ordering queue since the ordering for the transactions are independent. For example, a write transaction initiated by a first I/O device may write to memory line one of a system memory in an unordered domain via an unordered interface. A read transaction may read from memory line one and may be initiated by a second I/O device after the write transaction was stored in the upbound ordering queue. However, after comparing the address of the read transaction again the address of the write transaction, the read transaction may bypass the write transaction since the ordering rules associated with the read transaction are independent of the ordering rules associated with the write transaction.

Figure 15:
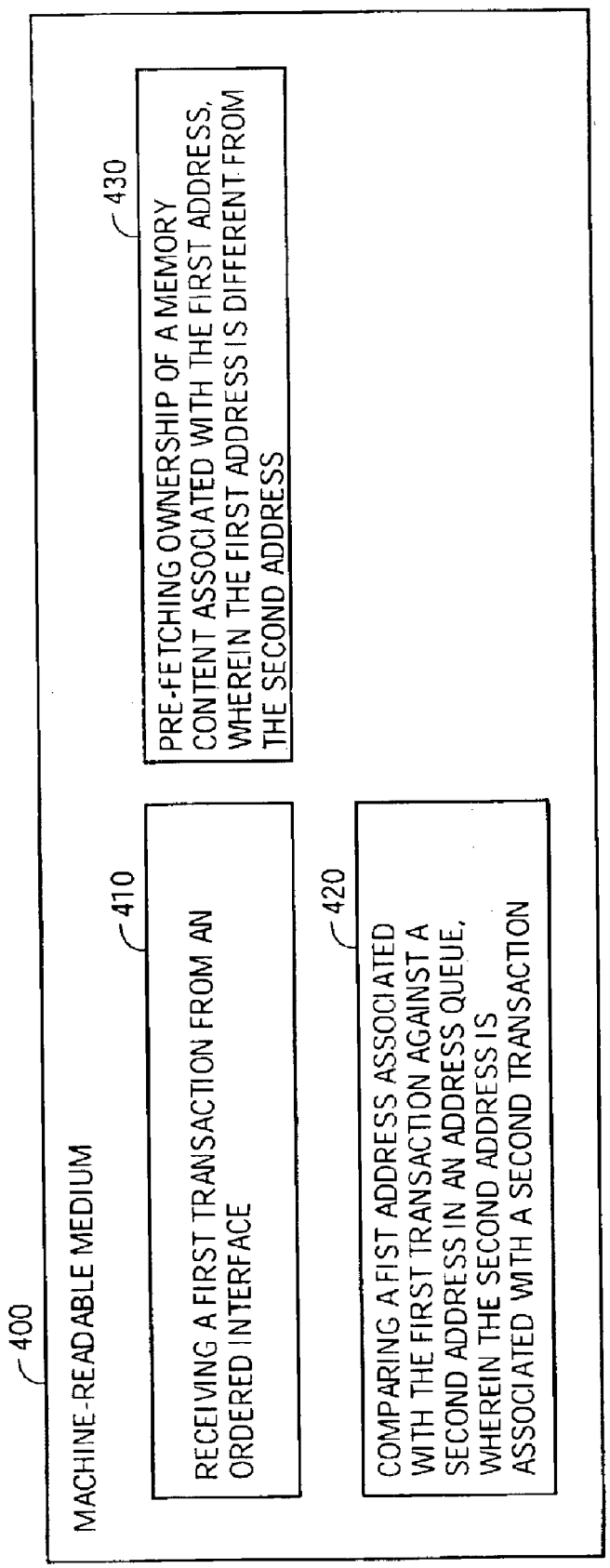
FIG. 15 depicts an embodiment of a machine-readable medium comprising instructions for a scalable system.

Referring now to FIG. 15, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 15 shows an embodiment of a machine-readable medium 400 comprising instructions for receiving a first transaction from an ordered interface 410; comparing a first address associated with the first transaction against a second address in an address queue, wherein the second address is associated with a second transaction 420; and pre-fetching ownership of a memory content associated with the first address, wherein the first address is different from the second address 430. Receiving a first transaction from an ordered interface 410 may comprise receiving a read or write transaction from an I/O device coupled with the ordered interface to transmit across an unordered interface.

Instructions for comparing a first address associated with the first transaction against a second address in an address queue, wherein the second address is associated with a second transaction 420, may comprise instructions for comparing an address associated with a write transaction against one or more addresses stored in an address queue to determine whether a pending transaction in an upbound ordering queue or pending on the unordered interface may be associated with the same or substantially the same address. For example, a transaction, after having satisfied ordering rules, may be pending on an unordered interface. A subsequent transaction may be received and the address associated with the transaction may match or substantially match the address of the transaction pending on the unordered interface. As a result, instructions may prevent the subsequent transaction from obtaining ownership of the memory line, wherein the subsequent transaction may comprise a write transaction. On the other hand, when the instruction may cause the subsequent transaction to be forwarded to an upbound ordering queue wherein the subsequent transaction comprises a read transaction.

Instructions for pre-fetching ownership of a memory content associated with the first address, wherein the first address is different from the second address 430 may comprise instructions for pre-fetching ownership for a write transaction wherein the address, such as a memory line address and/or hub ID, associated with the write transaction is different from one or more addresses stored in an address queue. The instructions to determine the address is different from one or more addresses stored in an address queue may comprise instructions to determine whether the write transaction is subject to ordering rules that are not independent of ordering rules of transactions awaiting transmission across the unordered interface.

Figure 16:
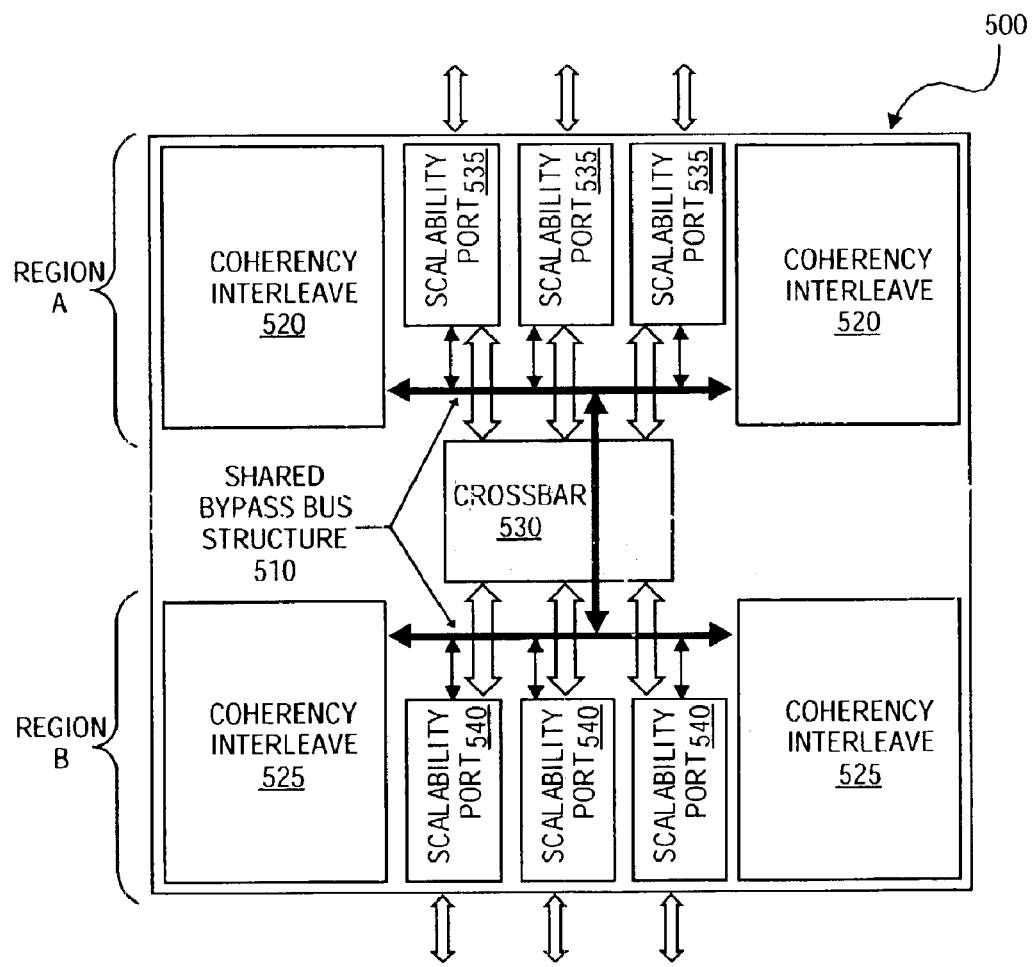
FIG. 16 depicts another example embodiment of a scalable switch comprising a shared bypass bus structure.

Referring now to FIG. 16, there is shown an example embodiment of an SPS 500 comprising a shared bypass bus structure 510. The shared bypass bus structure 510 may facilitate low-latency cache coherency operations by providing practical, fast connectivity from coherent interconnect ports to the component's coherency control structure that bypasses the port-to-port crossbar interconnect. For convenience in the following descriptions, the coherent interconnect ports are labeled as Scalability Ports (SP), and the coherency control structure is labeled as coherency interleaves, but these terms should not be read as limitations on the implementation of the described embodiments.

The shared bypass bus structure may comprise a first scalability port 535; bypass bus structure 510 coupled with said first scalability port 535; a coherency interleave, e.g. 520 or 525, coupled with said bypass structure 510 to transact with said first scalability port 535; a crossbar structure 530 coupled with said first scalability port 535; and a second scalability port 540 coupled with said crossbar structure 530 to transact with said first scalability port 535 and coupled with said bypass bus structure 510 to transact with said coherency interleave 520 or 525 substantially independent from a transaction with said first scalability port 535. The shared bypass bus structure 510 may couple between the Scalability Ports 535 and 540 and the coherency interleaves 520 and 525 of the switch component.

The shared bypass bus structure may comprise an incoming shared crossbar bypass data bus to transmit data from a localized group of Scalability Ports 535 to a coherency interleave 525 or to a localized group of coherency interleaves 525; an outgoing shared crossbar bypass data bus to transmit data from a coherency interleave 520 or from a localized group of coherency interleaves 520 to a localized group of Scalability Ports 540; a data bus multiplexing structure for each incoming or outgoing shared crossbar bypass data bus; and an arbitration controller with handshake signals. The data bus multiplexing structure may be an ordinary single-point data multiplexer which drives the shared bus, or may comprise distributed three-state driver buffers controlled such that exactly one set of buffers drives the shared bus at a given time.

Scalability Ports 535, for instance, located within the same region of the component may form a localized group of Scalability Ports which may share one or more incoming shared crossbar bypass data buses. Likewise, coherency interleaves 520, for instance, located within the same region of the component may form a group which may share one or more outgoing shared crossbar bypass data buses.

Figure 17:
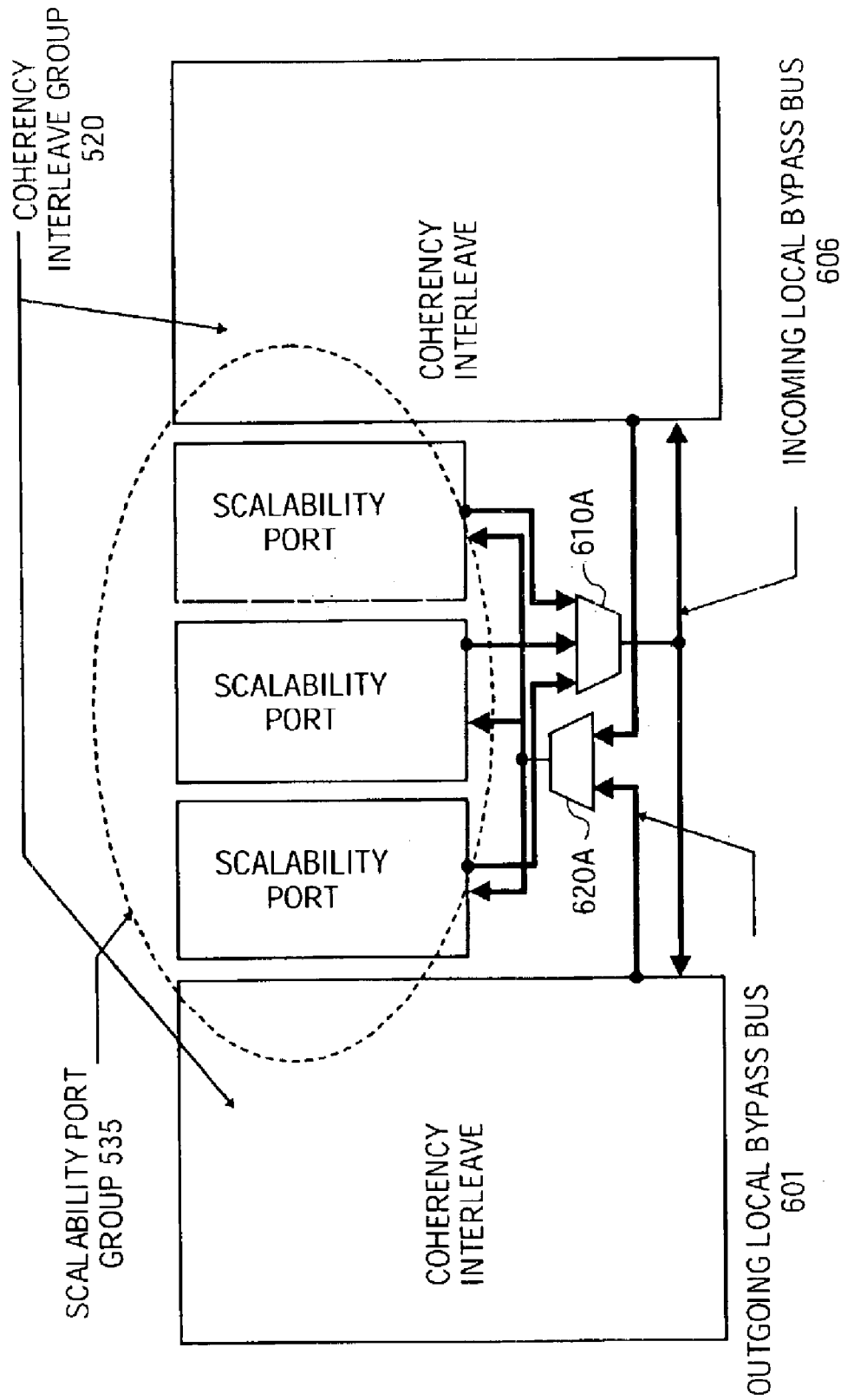
FIGS. 17–20 depict example embodiments of a shared bypass bus structure.
Figure 18:
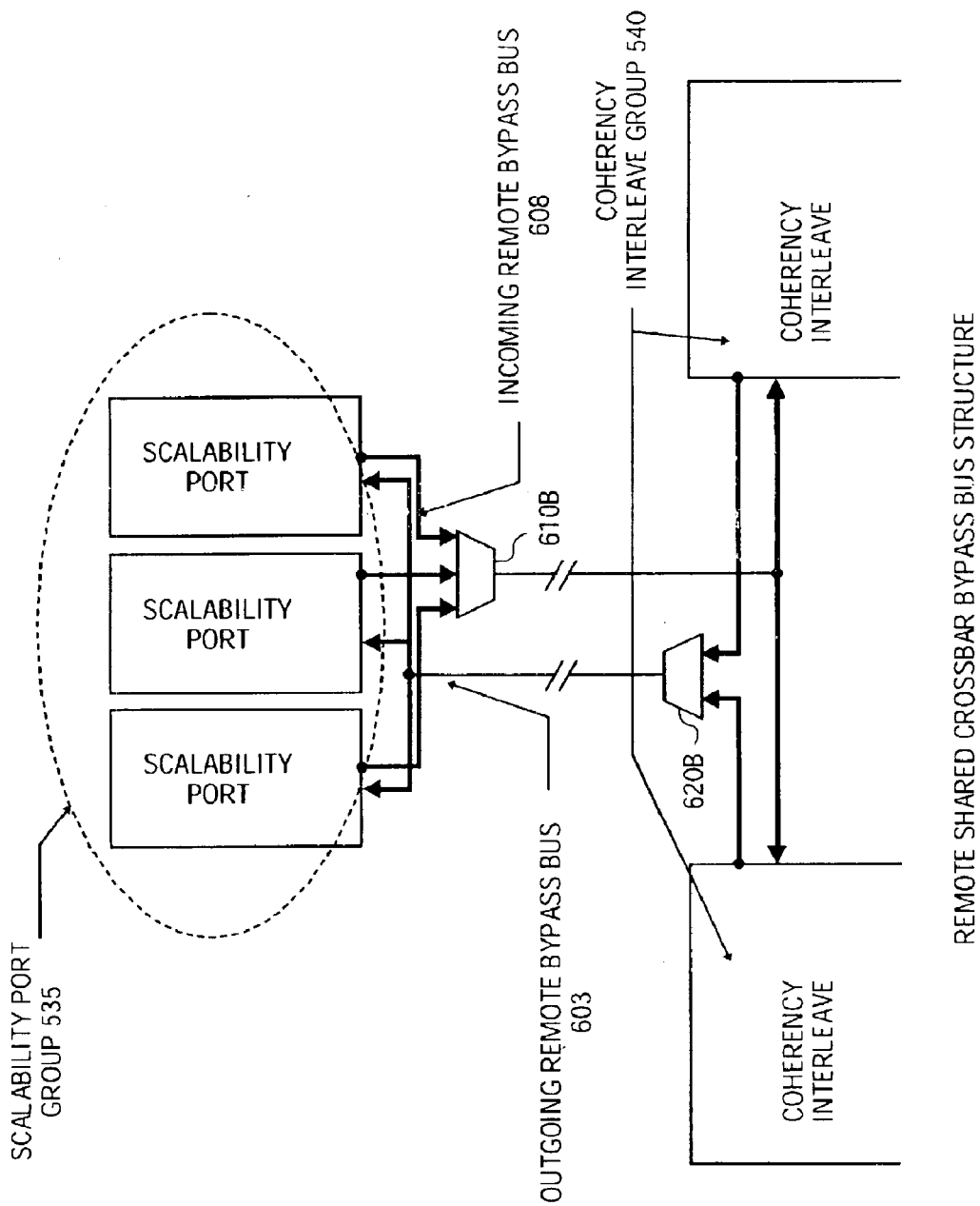

For a Scalability Port group 535 and a coherency interleave group 520 that may both reside in the same region of the component, the Shared crossbar bypass bus structure which connects these groups is referred to as a Local shared crossbar bypass bus structure. FIG. 17 depicts a Local shared crossbar bypass bus structure comprising the incoming local bypass bus 606 and outgoing local bypass bus 601. On the other hand, when the Scalability Port group 535 and the coherency interleave group 540 may be located in different regions of the component 500, the interconnect structure is termed a Remote shared crossbar bypass bus structure. FIG. 18 shows a Remote shared crossbar bypass bus structure, with an outgoing remote bypass bus 603 and an incoming remote bypass bus 608.

In several embodiments, a shared bypass bus structure may be used exclusively or substantially exclusively for communicating between a Scalability Port and a coherency interleave. In many of these embodiments, shared bypass bus structure may not be used for communicating between one Scalability Port and another Scalability Port, nor for communicating between two coherency interleaves.

Figure 19:
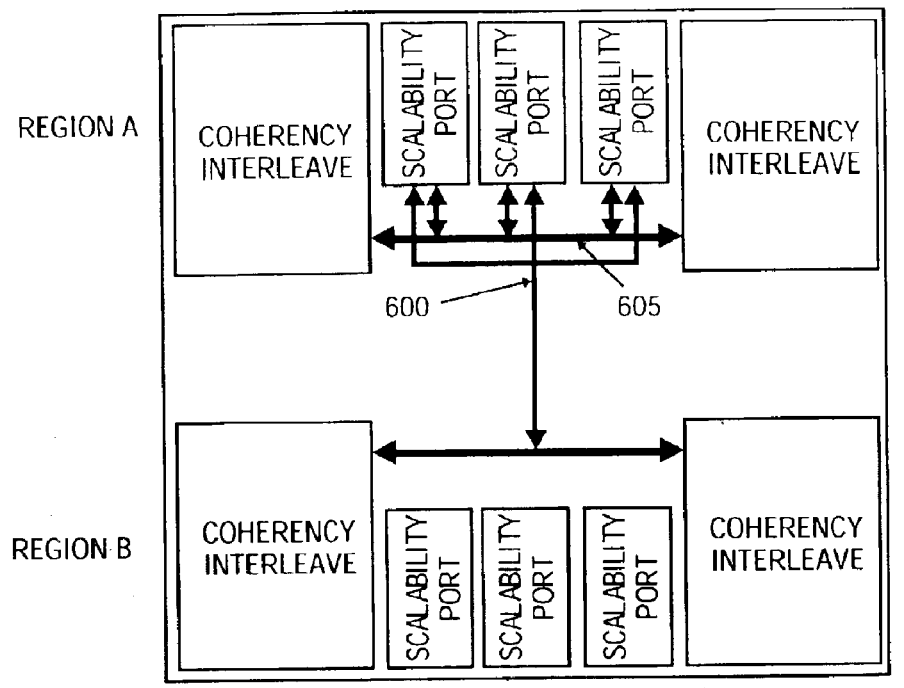
Figure 20:
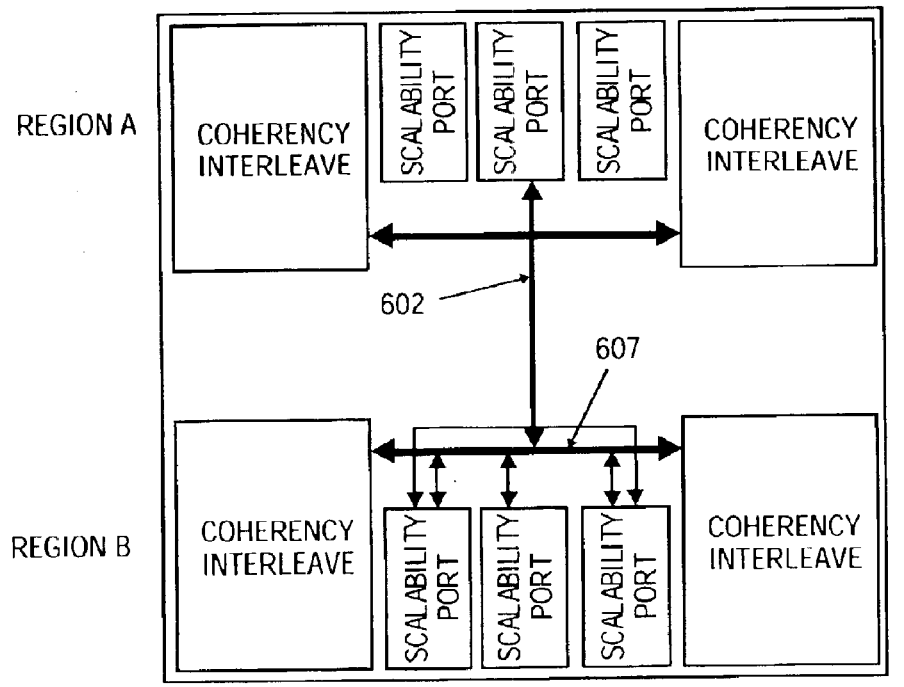

Shared bypass bus structure 510 may provide, in some embodiments, complete or substantially complete connectivity between Scalability Ports 535 and 540 and coherency interleaves 520 and 525 with m×n bus structures, where m may be the number of Scalability Port groups and n may be the number of coherency interleave groups. For example, in a component such as SPS 500 which has two Scalability Port groups 535 and 540 and two coherency interleave groups 520 and 525, with one Scalability Port group 535 and one coherency interleave group 520 in Region A, and the other Scalability Port group 540 and coherency interleave group 525 in Region B, then four Shared bypass bus structures may be used-two local bus structures (one within each region), and two remote bus structures (one to connect the Scalability Ports in Region A to the coherency interleaves in Region B, and one to connect the Scalability Ports in Region B to the coherency interleaves in Region A). FIGS. 19 and 20 show the Shared bypass bus structures 600, 605, 602, and 607 in such a component. Each Shared bypass bus structure has an incoming data bus and an outgoing data bus, for a total of eight buses in the embodiment of the component shown.

The Shared bypass bus structure may comprise an arbitration controller to coordinate the use of the buses and, in many embodiments, to provide for fair access to the buses such that no coherency interleave or SP may be indefinitely blocked from access to a bus by the activities of another unit.

In some embodiments, the Shared bypass bus structure may provide for communication of request and response information for memory cache coherency operations based on the a Scalability Port Protocol or a similar protocol. In the Scalability Port Protocol, to avoid or attempt to avoid deadlocks, request and response items may be transmissible independent of each other and may comprise independent flow control. For example, indefinite flow control against request information may not be permitted to block response information indefinitely. The arbitration controller of the Shared bypass bus structure may treat request and response information or data as two separate "virtual channels," and may provide for access to the buses for each virtual channel regardless of the status of the other virtual channel.

Shared bypass bus structure 510 may be shared both among multiple transmitters and among multiple receivers and may comprise parallel data bits, a data valid qualifier to identify valid data on a bus, a virtual channel qualifier to select a channel, and a multi-bit destination qualifier to select an address. A receiver may consider data on the bus to be valid after it recognizes its identification code in the destination field after the data valid signal is asserted. In addition, the buses may be accompanied by arbitration and handshaking signals to facilitate bus arbitration and flow control such as a request-channel arbitration request from each transmitting unit to the arbiter; a response-channel arbitration request from each transmitting unit to the arbiter; a selected signal from the arbiter to each transmitting unit, indicating that that transmitter owns the bus and its data can be observed by the receivers; a request-channel ready signal from each receiver for flow control, observed by all transmitters and by the arbiter; and a response-channel ready signal from each receiver for flow control, observed by all transmitters and by the arbiter.

In some embodiments, arbitration and multiplexing may be accomplished as close physically to the transmitting units as possible, to limit data bus congestion and silicon area consumption. Operations may comprise a unit, such as a coherency interleave or Scalability Port, having data to transmit asserting a request-channel arbitration request or a response-channel arbitration request. The unit may also transmit data to a local bus and may assert a valid signal. Then, based upon a selection mechanism and a fairness mechanism, such as a round-robin determiner, the arbiter may select one of the requesting units to own the bus in a subsequent clock cycle.

The arbiter may transmit a control signal to the bus multiplexor and may transmit a selected signal to a transmitter. After the transmitting unit observes that the data has been received, the valid qualifier may be de-asserted or new data may transmit.

Advantages of these embodiments may, for instance, comprise an approach to a connectivity problem that neither a crossbar switch structure, nor a collection of point-to-point buses, nor a component-wide multiply driven bus may feasibly or advantageously solve. Further, the Shared bypass bus structure may yield performance, cost, and architectural advantages over these other approaches. For example, in regards to Idle Latency, the performance presented here may combine advantages of a crossbar switch design with those of a direct-connect bus. The crossbar switch may provide high throughput and connectivity for the streaming of memory data between ports. Meanwhile operations to initiate memory transfers and to perform cache state lookups and updates may be allowed to bypass the crossbar, potentially yielding latency savings in the idle to light activity case. More specifically, in an embodiment comprising the chipset Scalability Port Switch component, the Scalability Port Switch component's latency contribution reduced by an estimated 20% to 30% for many common operations.

In some embodiments, the structure may also provide similar advantages over an alternative approach and even alternative embodiments, such as that of a component-wide multiply driven bus. The number of and distance between design units driving such a bus result in extra transmission times for control signals and bus driver turn-on and turn-off times, as well as possible frequency limitations as compared to the Shared crossbar bypass bus structure.

In regards to High-activity latency, like under heavier loading, given a mechanism to bypass the crossbar, cache state lookup and update operations may not compete with data streaming resources. The cache coherency operations may thus be processed immediately or substantially immediately, thereby providing performance gains under high-activity in many embodiments.

Another advantage may include area and cost improvements for some embodiments. Other embodiments, providing complete or substantially complete bipartite connectivity between all or most ports and interleaves via a coherency crossbar switch may comprise significantly more silicon area, which may raise the cost of those components. In further embodiments, the bypass structure may be expanded for data transfer between Scalability Ports and dedicated access ports may be added to the crossbar for the coherency interleaves, although this may be more costly in silicon area.

Alternatively, to address connectivity and latency requirements with a collection of point-to-point buses without the partitioning and sharing applied in the Shared bypass bus structure may likewise be more costly. The metal routing about the component to connect six ports to four interleaves and four interleaves to six ports may consume large amounts of silicon area. Similarly the routing congestion immediately surrounding each unit may be costly.

The Shared crossbar bypass bus structure design lowers development time and cost, and limits risk to the development schedule. In a conventional system, the logic and signal timing to share crossbar access ports between two distinct physical and logical design units on both the sending and receiving ends represent very difficult obstacles, to which some embodiments of the Shared bypass bus stricture may provides a simple alternative.

A further advantage may comprise partitioning. The Shared bypass bus structure lends itself well to the clean partitioning of the component into separate domains as a result of separating interleaves, regions, and/or SP's into distinct address ranges, for example. This aspect may facilitate development of chipsets or the like with desirable Reliability, Availability, and Serviceability (RAS) features.

Figure 21:
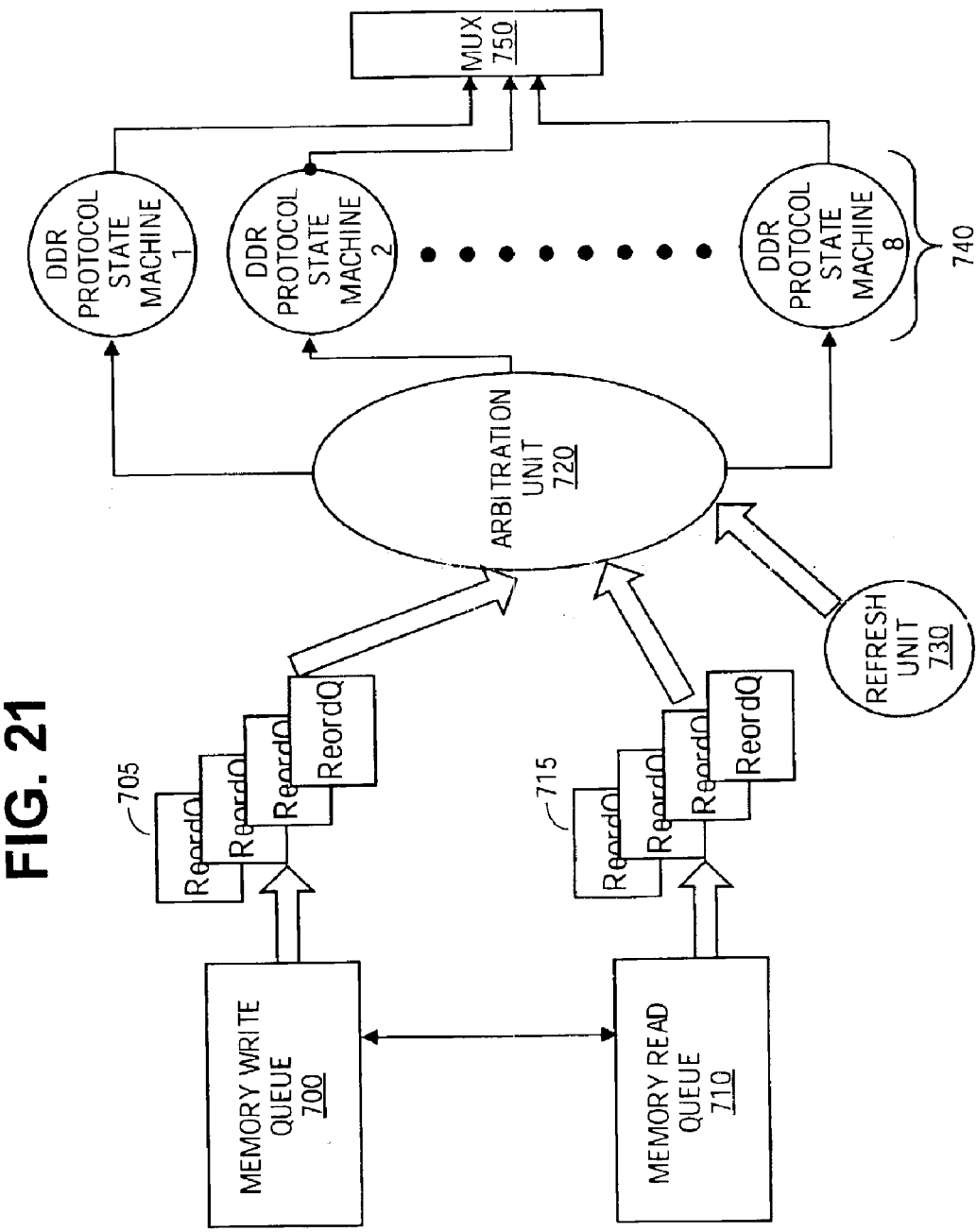
FIG. 21 depicts an example embodiment of an apparatus to re-order memory.

Referring to FIG. 21, there is shown an embodiment of block diagram for logic to re-order memory. The memory re-ordering mechanism in FIG. 21 may comprise memory write queue 700; write re-order queue 705; memory read queue 710; read reorder queue 715; arbitration unit and conflict checker 720; refresh unit 730, DDR protocol state machines 740 and multiplexer 750. Write queue 700 may hold, for example, 64 entries of requests and data to write to an address in memory. Similarly, read queue 710, for example, may hold 32 entries of read requests for memory. If a read may access the same address as a write, which is present in the write queue 700, data may be forwarded from the pending data buffer to the requestor or agent without accessing physical memory. Writes may be flushed to memory in absence of reads and reads may fetch data from memory if they do not have a hit in write queue 700.

Reads and writes may comprise inbound and/or upbound requests for memory. In some embodiments, the reads and writes that may remain in the read and write queues 700 and 710, may be forwarded or transmitted to the re-ordering queues 705 and 715. The present embodiment may comprise four write re-order queues 705 and four read re-order queues 715 for write requests and read requests, respectively, and a re-order queue may be two entries deep so that 8 reads and 8 writes may be stored in the re-order queues 705 and 715. Re-order queues 705 and 715 may become filled after a request belonging to that re-order queue arrives (for write requests after data has been received). Read/write requests may be distributed to reordering queues 705 and 715 depending on which DDR channel (if there are independent DDR channels) and/or bank is targeted. In some embodiments, for instance, two channels of DDR I and bank address bit B[0] may also used.

Arbitration unit 720 may check timing conflicts and may schedule a request to one of the 8 protocol state machines. The arbitration unit may look at 4 read requests and 4 write request at a time or substantially simultaneously. If there is no read or write request in the queue that may belong to a particular re-order queue based upon the channel number and/or the bank number, then that reorder queue may be empty in many embodiments. Arbitration unit may keep track of memory addresses that are currently accessing memory and compare those addresses with 4 read addresses and 4 write addresses from the re-order queues 705 and 715. A read or write request may be picked up in such a way that it may schedule to access memory immediately. Among reads/writes and refreshes, such as a refresh of DRAM or dynamic random access memory, refresh may have the highest or nearly the highest priority, in part because, in many embodiments, refreshes may not occur often. Read requests may comprise a second priority and then writes may be at a third priority level, unless, for instance, the write queue 700 is full. When the write queue 700 is full, the write requests may be at a second priority level.

A round robin priority determiner may facilitate selection of one of the four read requests and one of the four write requests from re-order queues 705 and 715, unless the queue entry has a conflict with an ongoing transaction. Further, in several embodiments, when a re-order queue is skipped then it is marked and receives a high or a highest priority after some time. After a request has been scheduled by Arbitration unit, the request may go to one of the 8 DDR state machines for access to memory.

Arbitration unit and conflict check logic 720 or state machine may check for page replace conflicts and DIMM conflicts. Page replace conflicts may involve a greater penalty than a DIMM conflict in terms of turnaround time. So if all re-order queue entries may have involve a conflict, an entry with a page replace conflict gets a lower priority. The present embodiment may shows great performance gain on memory bandwidth. For example, memory reads/writes may be distributed in 4 re-order queues each. The arbitration unit may review up to 8 transactions that are pending to be scheduled and also the transactions that are currently scheduled on DRAM channel by one of the 8 state machines. Arbitration unit may first look for transactions with page empty or page hit cases to be scheduled. Then, read/write requests with a page replace with existing transaction or a DIMM turnaround conflict may be pushed out until the timing conflict is eliminated.

State machines, such as DDR protocol state machines 740, may schedule one read or write transaction to a DDR channel and hold that entry until the transaction is complete. The present embodiment may comprise 8 DDR protocol state machines.

Embodiments may provide better feedback from DRAM protocol state machines so arbitration unit does not have to wait for a data phase to complete before the next transaction to the same resource is scheduled. Some embodiments may not have one reordering queue per resource, for example, embodiments may comprise 4 read and 4 write reorder queues 705 and 715 and may provide re-ordering and feedback from 8 state machines may provide more information. Further, embodiments may comprise no or infrequent timing dependency between different re-order queues and in the same queue there may or may not be timing dependency. Top entries of a re-order queue may not be checked against one other and a state machine may schedule one transaction as opposed to one state machine per bank or per resource.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
    a bypass bus structure coupled between a first coherent interconnect port and a coherency control structure to transmit data for a cache coherency operation substantially independent of transmission with a crossbar structure coupled to the first coherent interconnect port; and
    an arbitrator coupled with the bypass bus structure to coordinate transmission of the data between the first coherent interconnect port and the coherency control structure.

2. The apparatus of claim 1, wherein the bypass bus structure comprises a multiplexing structure to transmit more than one transaction on the bypass bus structure.

3. The apparatus of claim 1, wherein the bypass bus structure comprises an incoming bus and an outgoing bus.

4. The apparatus of claim 1, wherein the first coherent interconnect port is coupled with a downbound snoop path and a second coherent interconnect port is coupled with a scalable node controller.

5. The apparatus of claim 1, wherein the bypass bus structure comprises a remote bus structure and a local bus structure.

* * * * *

UNITED STATES PATENT AND TRADEMARK OFFICE
CERTIFICATE OF CORRECTION

PATENT NO. : 6,912,612 B2 Page 1 of 1
DATED : June 28, 2005
INVENTOR(S) : Kapur

It is certified that error appears in the above-identified patent and that said Letters Patent is hereby corrected as shown below:

Column 20,
Line 11, delete "PCT" and insert -- PCI --.

Column 22,
Line 16, delete "lime" and insert -- time --.

Column 35,
Line 30, delete "stricture" and insert -- structure --.

Signed and Sealed this

Sixth Day of September, 2005

JON W. DUDAS
*Director of the United States Patent and Trademark Office*